(12) United States Patent
Takahashi et al.

(10) Patent No.: US 7,865,680 B2
(45) Date of Patent: Jan. 4, 2011

(54) REMOTE COPY SYSTEM

(75) Inventors: Masamitsu Takahashi, Chigasaki (JP); Toru Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 12/003,901

(22) Filed: Jan. 3, 2008

(65) Prior Publication Data

US 2008/0177964 A1   Jul. 24, 2008

(30) Foreign Application Priority Data

Jan. 24, 2007   (JP) .............................. 2007-013752

(51) Int. Cl.
*G06F 12/00* (2006.01)
*G06F 13/00* (2006.01)
*G06F 13/28* (2006.01)

(52) U.S. Cl. ..................................... 711/162
(58) Field of Classification Search .................. 711/162
See application file for complete search history.

(56) References Cited

U.S. PATENT DOCUMENTS

| | | | | |
|---|---|---|---|---|
| 5,657,320 | A * | 8/1997 | Russ et al. .................. 370/217 |
| 6,691,245 | B1 * | 2/2004 | DeKoning ..................... 714/6 |
| 7,167,963 | B2 * | 1/2007 | Hirakawa et al. ........... 711/162 |
| 7,418,565 | B2 * | 8/2008 | Takeda et al. ............... 711/162 |
| 7,600,087 | B2 * | 10/2009 | Yamagami .................. 711/162 |
| 7,660,957 | B2 * | 2/2010 | Hirakawa et al. ........... 711/162 |
| 2004/0073831 | A1 * | 4/2004 | Yanai et al. ..................... 714/7 |
| 2004/0268067 | A1 * | 12/2004 | Yamagami .................. 711/159 |
| 2005/0060505 | A1 * | 3/2005 | Kasako et al. ............... 711/162 |
| 2005/0132155 | A1 * | 6/2005 | Kasako ....................... 711/162 |
| 2006/0031646 | A1 |  2/2006 | Maruyama et al. |
| 2006/0174076 | A1 * | 8/2006 | Takeda et al. ............... 711/162 |

FOREIGN PATENT DOCUMENTS

JP   2006-079568   9/2004

* cited by examiner

*Primary Examiner*—Sheng-Jen Tsai
(74) *Attorney, Agent, or Firm*—Foley & Lardner, LLP

(57) ABSTRACT

Provided is a remote copy system capable of guaranteeing the time ordering of data to be handled by a remote site even when the tasks at the remote site are operated across a plurality of storages or a plurality of volume groups. A consistency group consisting of a secondary journal volume and a replica is associated with a journal group consisting of a primary data volume, a primary journal volume, a secondary journal volume, and a secondary data volume. Upon backing up a secondary data volume and forming a replica, the host system issues a backup time reservation command to a storage apparatus, and the storage apparatus creates a replica by comparing the time stamp added to the journal data and the backup reservation time.

5 Claims, 21 Drawing Sheets

FIG.7

<REMOTE COPY PAIR CONTROL TABLE>

| VOLUME # | COPY DESTINATION APPARATUS # | COPY DESTINATION VOLUME # | JOURNAL GROUP # | PAIR STATUS | ... |
|---|---|---|---|---|---|
| 0x0000 | 1234 | 0x0000 | 0x03 | Duplex | ... |
| 0x0001 | NULL | NULL | NULL | Simplex | ... |
| 0x0002 | 1234 | 0x0002 | 0x03 | Duplex | ... |
| 0x0003 | 22550 | 0x0203 | 0x12 | Suspend | ... |
| : | : | : | : | : | ... |
| 0xFEFF | NULL | NULL | NULL | Simplex | ... |
| : | : | : | : | : | ... |

FIG.8

<JOURNAL GROUP MANAGEMENT TABLE>

| JOURNAL GROUP # | VOLUME COUNT | VOLUME # | SIZE | JOURNAL START POSITION | JOURNAL END POSITION | ... |
|---|---|---|---|---|---|---|
| 0x00 | 5 | 0x0010, ... (5) | 0xA0000000 | 0x30000000 | 0x92450000 | ... |
| 0x01 | 1 | 0x0200 | 0x00200000 | 0x00108000 | 0x00140000 | ... |
| 0x02 | 1 | 0x1080 | 0x01000000 | 0x00101200 | 0x00F11200 | ... |
| 0x03 | 0 | NULL | NULL | NULL | NULL | ... |
| : | : | : | : | : | : | ... |
| 0xFF | 0 | NULL | NULL | NULL | NULL | ... |

FIG.9

<REPLICA FUNCTION PAIR CONTROL TABLE>

| COPY SOURCE VOLUME # | COPY DESTINATION VOLUME # | CONSISTENCY GROUP # | PAIR STATUS | ... |
|---|---|---|---|---|
| 0x0000 | 0x0010 | 0x10 | Duplex | ... |
| 0x0001 | NULL | NULL | Simplex | ... |
| 0x0002 | 0x0102 | 0x20 | Duplex | ... |
| 0x0003 | 0x4303 | 0x30 | Suspend | ... |
| : | : | | : | ... |
| 0xFEFF | NULL | NULL | Simplex | ... |
| : | : | | : | ... |

FIG.10

<COPY GROUP MANAGEMENT TABLE>

| NAME | COPY TYPE | PAIR COUNT | LOCAL DKC | REMOTE DKC | GROUP # | ... |
|---|---|---|---|---|---|---|
| A | REMOTE COPY | 10 | DKC-A | DKC-C | 0x00 | ... |
| B | REMOTE COPY | 5 | DKC-A | DKC-C | 0x01 | ... |
| C | REMOTE COPY | 8 | DKC-B | DKC-D | 0x02 | ... |
| D | REPLICA FUNCTION | 10 | DKC-C | NULL | 0x00 | ... |
| E | REPLICA FUNCTION | 5 | DKC-C | NULL | 0x01 | ... |
| F | REPLICA FUNCTION | 8 | DKC-D | NULL | 0x02 | ... |
| : | : | : | : | : | : | ... |

FIG.11

<COPY GROUP A PAIR MANAGEMENT TABLE>

| LOCAL VOLUME # | REMOTE VOLUME # |
|---|---|
| 0x0000 | 0x0000 |
| 0x0001 | 0x0001 |
| 0x0002 | 0x0002 |
| : | : |

FIG.12

<COPY GROUP CONTAINER MANAGEMENT TABLE>

| NAME | COPY GROUP COUNT | COPY GROUP 1 | COPY GROUP 2 | COPY GROUP 3 | ... | ... | ... |
|---|---|---|---|---|---|---|---|
| AA | 3 | A | B | C | ... | ... | ... |
| BB | 3 | D | E | F | ... | ... | ... |
| : | : | : | : | : | ... | ... | ... |

FIG.18

<RESERVATION MANAGEMENT TABLE>

| JOURNAL GROUP # | GENERATION FLAG | RESTORE PROCESSING MODE | REPLICA GENERATION #1 ||||| GENERATION #2 |
| --- | --- | --- | --- | --- | --- | --- | --- | --- |
| | | | CONSISTENCY GROUP # | PAIR STATUS | RESERVATION TIME | TIME-OUT TIME | ACCEPTANCE TIME | |
| X'00' | #1 VALID | BOOT | X'10' | SPLIT COMPLETE | 11:00 | 60 MINUTES | 10:23 | ... |
| X'01' | INVALID | - | - | - | - | - | - | - |
| X'02' | #2 VALID | STOP | - | - | - | - | - | ... |
| .. | .. | .. | .. | .. | .. | .. | .. | ... |

REMOTE COPY SYSTEM

CROSS REFERENCES

This application relates to and claims priority from Japanese Patent Application No. 2007-013752, filed on Jan. 24, 2007, the entire disclosure of which is incorporated herein by reference.

BACKGROUND

The present invention relates to a remote copy system for remote copying data from a local site to a remote site, and a control method of such a remote copy system.

Calamities, fires or other disasters such as power failure could cause the loss of data stored in a storage apparatus or the suspension of business using such storage apparatus. A storage system using a storage apparatus needs to possess resistance against these calamities and disasters and ongoingly provide services to customers. Thus, a remote copy system for disaster recovery has been realized.

This remote copy system establishes a remote site in an area that will not be affected by the failure that occurs in a local site, and copies data from the local site to the remote site. When a failure occurs in a storage system established in the local site, the storage system at the remote site takes over the tasks of the storage system at the local site, and the remote site thereby continues to provide services to customers.

There are two methods of remote copying; namely, synchronous remote copy and asynchronous remote copy. Synchronous remote copy is a method of notifying a host system I/O completion report to the host system after the writing (remote copy I/O) of data in a secondary volume of a storage system at a remote site is guaranteed. Therefore, from the perspective of the host system, the writing guaranteed in the primary volume at the local site will also be guaranteed in the secondary volume. Thereby, it is possible to prevent transactions from the host system from becoming lost during disasters. Nevertheless, since the host system is required to wait until the remote I/O is completed, the response performance of the host system will deteriorate.

With asynchronous remote copy, since the host system I/O and the remote copy I/O are processed asynchronously, the storage apparatus at the local site is able to send a host system I/O completion report to the host system without having to confirm that the remote I/O (writing) to the secondary volume is guaranteed. Nevertheless, since the writing guaranteed in the primary volume is not guaranteed in the secondary volume, there is a possibility that the transaction may be lost during disasters, but the performance of the host system will not be affected even when the distance between the sites is increased.

Japanese Patent Laid-Open Publication No. 2006-79568 explains an example of this kind of asynchronous remote copy. The remote copy system explained therein is as follows. In a storage [apparatus] at a secondary site, two local replicas are prepared for a volume storing data transferred from a primary site with asynchronous remote copy, and a pair of the respective local replicas constantly prepares replica data guaranteeing the time ordering by alternately stopping based on a time-designated stop command according to the time of the time stamp given to the write data. Then, data is recovered using these replicas when a failure occurs in the primary site.

SUMMARY

There are cases where data handled in systems of financial institutions and the like is enormous, and the data volume used in a signal business operation cannot be covered with the capacity of a single storage apparatus or a single volume group. In such cases, business operation is conducted across a plurality of storage apparatuses or a plurality of volume groups.

Here, so as long as the storage apparatus at the local site is being operated normally, there is no need to take special note of the consistency regarding the remote I/O in the storage apparatus at the remote site so as long as the consistency of the time ordering in the host system I/O at the local site is ensured. Nevertheless, when a disaster occurs at the local site and it is necessary to switch to the remote site in order to continue business, data consistency at the local site must be guaranteed.

Particularly with asynchronous remote copy that copies data to a remote location, the consistency of data ordering can only be guaranteed in storage apparatus units or volume group units. Thus, when the operation of business tasks at the remote site is conducted across a plurality of storages or a plurality of volume groups, there is a problem in that the consistency of data is not guaranteed. Thus, for example, when forming a replica by performing backup processing from a secondary volume across a plurality of storages or a plurality of volume groups at the remote site, there is a problem in that the consistency of data cannot be ensured in the replica.

Thus, an object of the present invention is to provide a remote copy system capable of guaranteeing the time ordering of data to be handled by a remote site even when the tasks at the remote site are operated across a plurality of storages or a plurality of volume groups. Another object of the present invention is to provide a remote copy system capable of guaranteeing the time ordering of data of each replica when creating a plurality of replicas at a remote site. Still another object of the present invention is to provide a remote copy system capable of nondisruptively continuing remote copy upon creating a replica from a secondary volume at a remote site.

In order to achieve the foregoing objects, the present invention provides a remote copy system in which a volume group for performing remote copy is associated with a volume group for performing backup, and, by using the time ordering of data to be remote copied, it is possible to create a plurality of replicas possessing consistency regarding the time ordering even when a volume is separated between both groups while backup is being performed. According to the present invention, it is possible to obtain a plurality of replicas with consistency even when the operation of business tasks at the remote site is conducted across a plurality of storages or a plurality of volume groups.

Further, by allocating a physical storage extent of a high-capacity storage device such as a hard disk drive to a journal volume recording journal data at the remote site, it is possible to continue performing remote copy from the local site to the remote site even while the restoration of journal data to the secondary journal volume is suspended.

According to the present invention, it is possible to provide a remote copy system capable of guaranteeing the time ordering of data handled by the remote site even when the business at the remote site is operated across a plurality of storages and a plurality of volume groups.

Further, according to the present invention, it is possible to provide a remote copy system capable of guaranteeing the time ordering of data of each replica when creating a plurality of replicas at the remote site.

Moreover, according to the present invention, it is possible to provide a remote copy system capable of nondisruptively continuing remote copy upon creating a replica from the secondary volume at the remote site.

DESCRIPTION OF DRAWINGS

FIG. 7 shows a remote copy pair control table;

FIG. 8 shows a journal group management table;

FIG. 9 shows a replica function pair control table;

FIG. 10 shows a copy group management table;

FIG. 11 shows a copy group pair management table;

FIG. 12 shows a copy group container management table;

FIG. 18 is a management table showing the reservation contents of the backup time;

DETAILED DESCRIPTION

Figure 1:
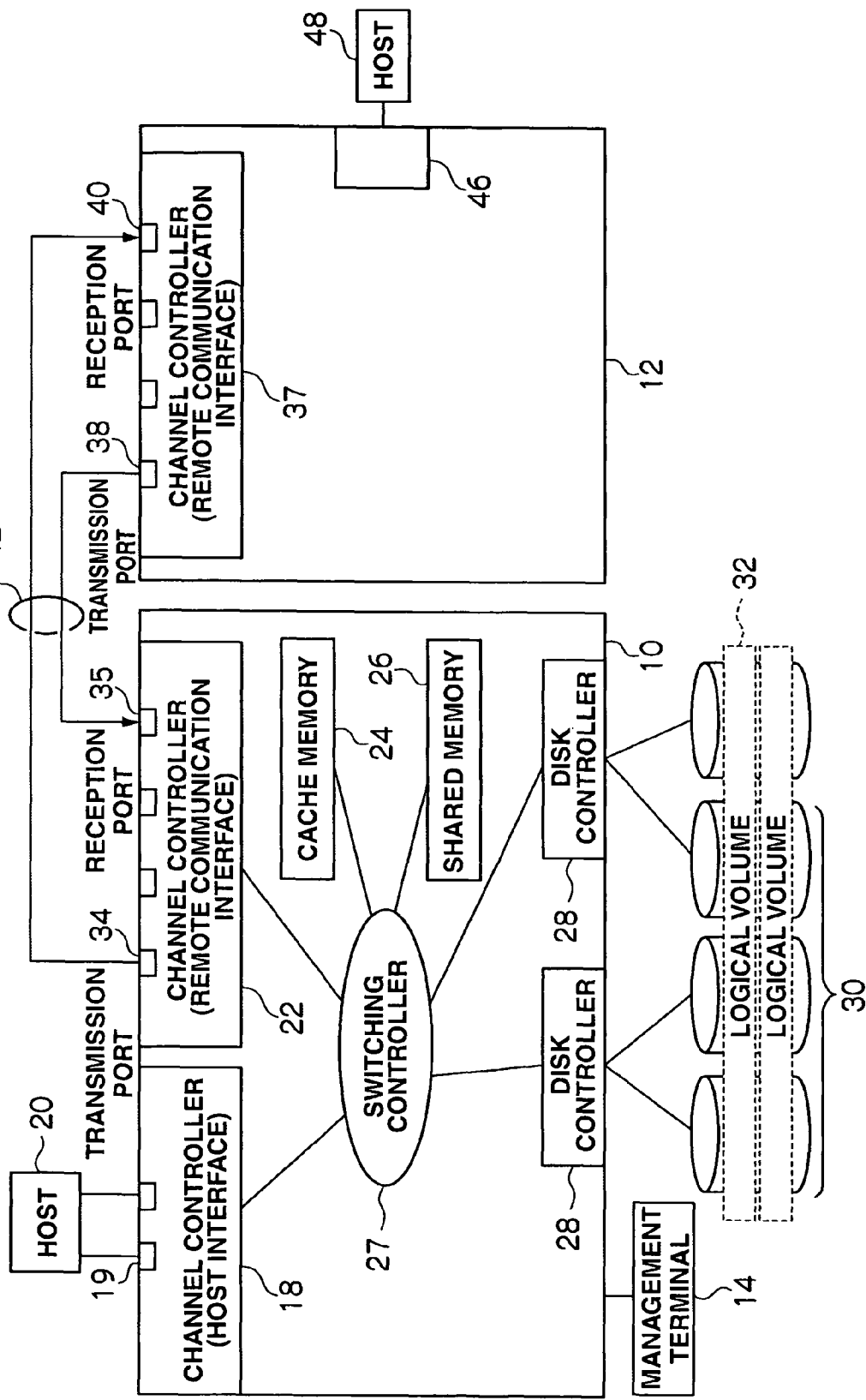
FIG. 1 is a hardware block diagram showing an embodiment of the remote copy system according to the present invention.

An embodiment of the remote copy system according to the present invention is now explained. FIG. 1 is a block configuration diagram showing the remote copy system. This system is configured from a storage system configuring a local site, a storage [system] configuring a remote site, and a communication path that connects the two systems.

The storage system at the local site is configured from a first storage apparatus 10, and a host system 20 connected thereto. The remote site is configured from a second storage apparatus 12, and a host system 48 connected thereto.

When a disaster such as an earthquake occurs at the local site and the storage apparatus 10 or the host system 20 at the local site is affected, the storage apparatus 12 and the host system 48 at the remote site will take over the business operation of the local site. The host system 20 connected to the first storage apparatus 10 may also double as the host system 48 connected to the second storage apparatus 12.

Configuration of the first storage apparatus 10 is now explained. The first storage apparatus comprises a channel controller 18 as a host system interface to be connected to the host system 20, a channel controller 22 as a remote communication interface to be connected to the remote site-side storage [apparatus] 12, a cache memory 24, a shared memory 26, a plurality of hard disk drives 30, a disk controller 28 as an interface with the hard disk drives, and a switching controller 27. The channel controllers 18 and 22, the cache memory 24, the shared memory 26, and the disk controller 28 are mutually connectable via the switching controller 27.

The channel controller 18 as the host system interface has a port 19 that is connected to the host system 20. Data and commands are sent and received between the host system 20 and the first storage apparatus 10 via this port.

The channel controller 22 as the remote communication interface controls the sending and receiving of commands and data between the first storage apparatus 10 and the second storage apparatus 12. The channel controller 22 is connected to the channel controller 37 as the remote communication interface of the second storage apparatus 12. The transmission port 34 of the channel controller 22 is connected to the reception port 40 of the channel controller 37, and the reception port 35 of the channel controller 22 is connected to the transmission port 38 of the channel controller 37.

The cache memory 24 temporarily stores write data from the host system 20 and read data to the host system 20, and data sent from the first storage apparatus to the second storage apparatus based on the remote copy function. The shared memory 26 stores control information necessary in controlling the remote copy function to be performed between the first storage apparatus 10 and the second storage apparatus 12.

The channel controllers 18 and 22 are connected to the disk controller 28 via the switching controller 27. Further, the switching controller 27 is connected to the cache memory 24 and the shared memory 26. The management terminal 14 is connected to the channel controllers 18, 22 and the disk controller 28 via the switching controller 27, and is configured from a computer for managing the storage apparatus. The management terminal 14 is used for setting microprograms in the channel controllers 18 and 22, and the disk controller 28.

The storage apparatus 10 has a plurality of hard disk drives 30. The storage apparatus receives operations from the management terminal 14 or the host system 20, and creates a single RAID group (parity group) from the plurality of hard disk drives 30. The storage apparatus 10 logically splits the RAID group so that each split can be recognized as an individual disk device from the host system. This logical storage extent is referred to as a logical volume or a logical device (LDEV) in a mainframe, and referred to as a logical unit (LU) in an open system. The term "volume" used in the claims is a collective appellation of logical volumes, logical devices, and logical units. The host system 20 recognizes the volume 32 and issues a write or read command to the storage apparatus 10.

The remote site-side storage apparatus 12 comprises a channel controller 37 having a port connected to the local site-site storage [apparatus], and a channel controller 46 connected to the host system 48. The remaining configuration is the same as the storage apparatus 10. The shared memory of the storage apparatus 12 stores control information to be referred to by the channel controller 37 upon such channel controller 37 executing remote copy and creating a replica.

A network 42 connects the first storage apparatus 10 and the second storage apparatus 12, and sends and receives data and commands necessary for the remote copy to be performed between both storage apparatuses.

Figure 2:
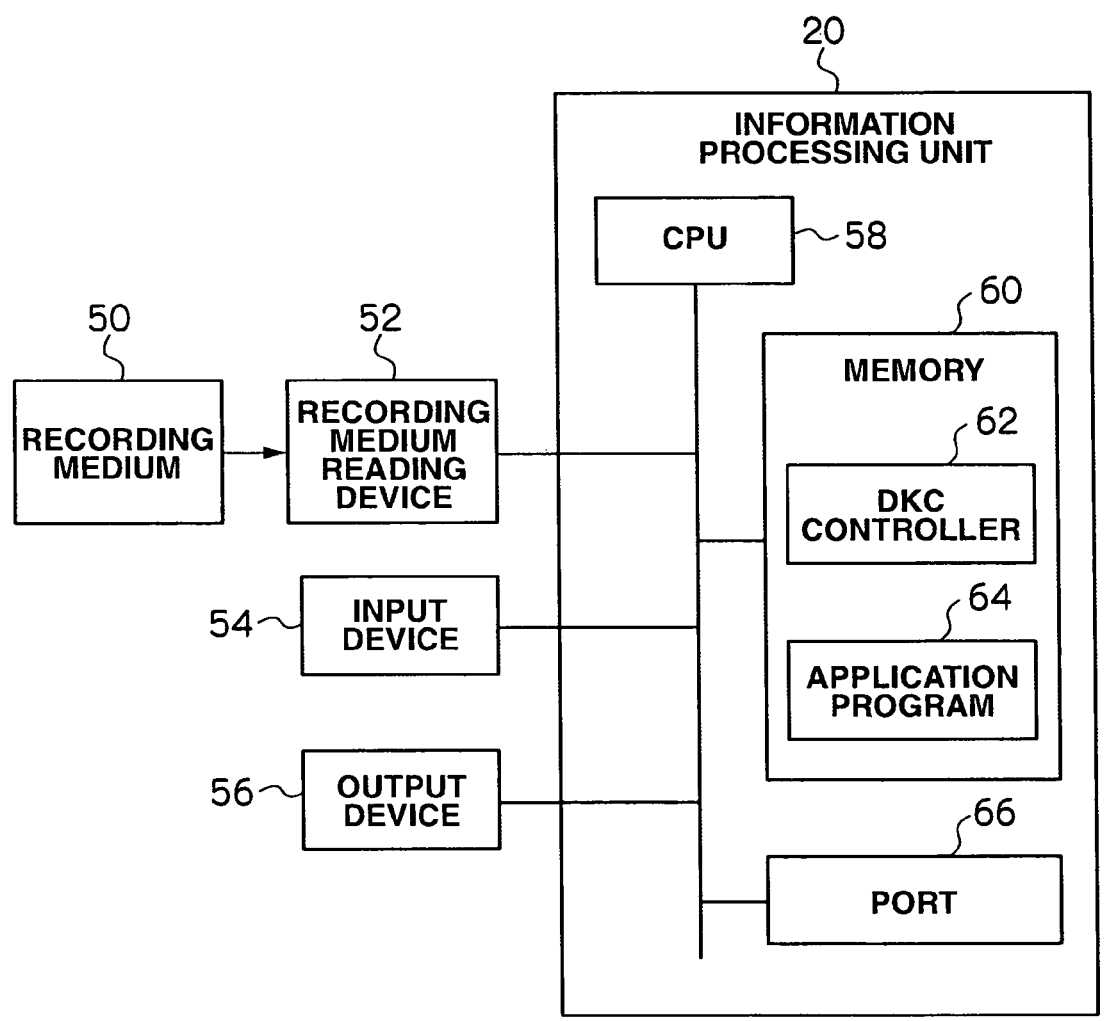
FIG. 2 is a hardware block diagram of a host system (information processing unit)

FIG. 2 is a block diagram of the host system 20. In addition to issuing a write I/O to the storage apparatus 10, the host system 20 also creates commands necessary for the remote copy to be performed between the storage apparatus 10 and the storage apparatus 12 and the replication to be performed in the storage apparatus 12, and issues these commands to the storage apparatus 10 and the storage apparatus 12. Commands to the storage apparatus 12 may also be created by the host system 48.

The host system 20 is connected to a recording medium reading device 52 to which a recording medium 50 is to be interested, an input device 54, and an output device 56. The host system 20 comprises a port 66 connected to the storage apparatus 10, a memory 60, and a CPU 58 for executing various control processing routines based on programs 62 and 53 stored in the memory.

The memory 60 comprises a controller (DKC controller) 62 of the storage apparatus, and an application program 64. The application program uses the logical volume 32 of the storage apparatus 10 to perform business tasks such as transaction processing. Further, the application program performs business tasks such as creating replicas in the storage apparatus 12. Upon the host system 20 issuing a write [command] to the logical volume 32, it adds the write time to write data using the clock of the host system. The time information added to the data to be written by the host system is referred to as a time stamp. This time stamp is an example of a parameter showing the time ordering of data as described in the claims.

The DKC controller 62 forms a pair of the logical volume of the storage apparatus 10 and the logical volume of the storage apparatus 12 upon executing the asynchronous remote copy from the storage apparatus 10 to the storage apparatus 12, and creates a command for operating this pair. Further, after the DKC controller forms a volume pair for forming a replica in the storage apparatus 12, it creates a command for designating the timing of creating the replica.

A pair refers to a set of a plurality of volumes. A plurality of volume pairs is required in order to realize the remote copy system illustrated in FIG. 1; namely, a volume pair for performing remote copy, and a volume pair for creating a replica in the storage apparatus 12. As described above, a pair operation command for creating a volume pair or changing the status of the volume pair is issued from the host system to the storage apparatuses 10 and 12. The storage apparatus receives this command and registers the pair in a control table, or registers the change in the pair status in the control table. The control unit of the storage apparatus refers to the control table to perform remote copy between the remote copy pair volumes, and creates a replica between the replica pair volumes (local replication). The channel controller is an example of this control apparatus.

Figure 3:
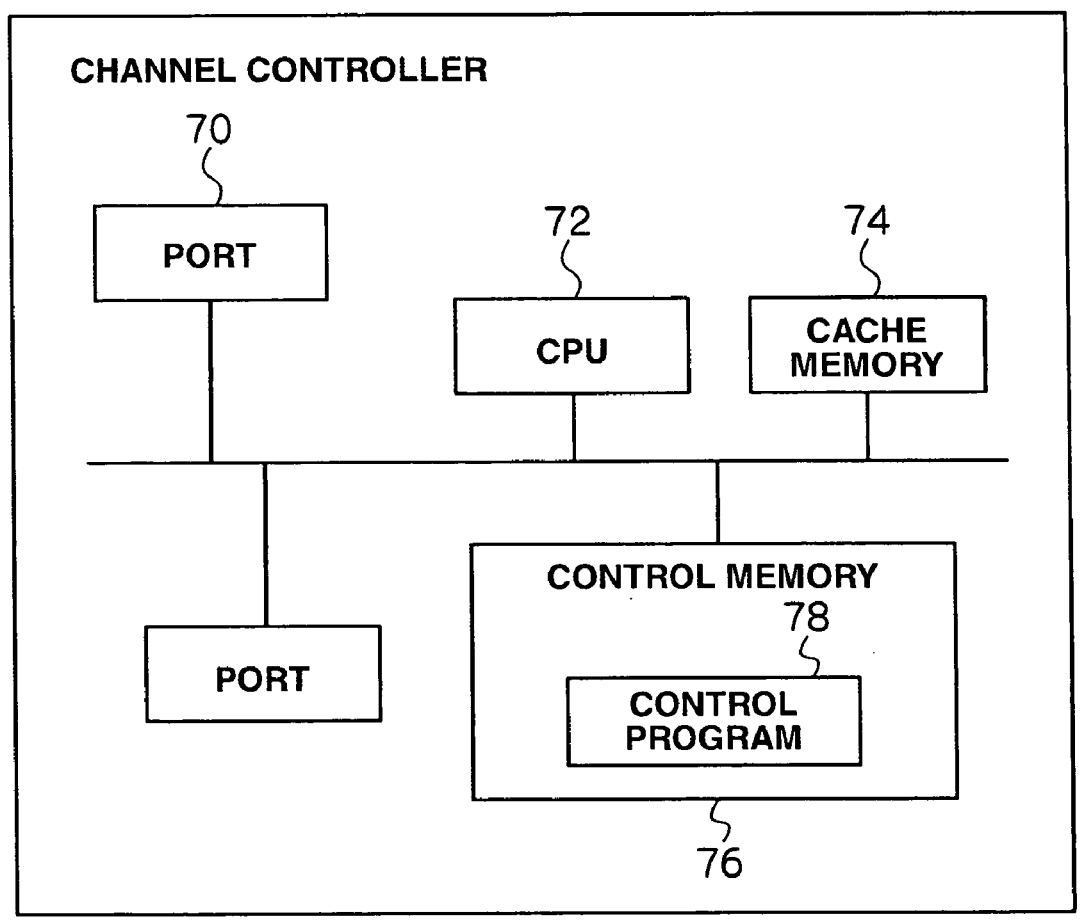
FIG. 3 is a hardware block diagram of a channel controller of a storage apparatus.

FIG. 3 is a block diagram of the channel controller illustrated in FIG. 1. The channel controller governs the control of the storage apparatus on the front-end side, and controls the reading and writing between the host system and the storage apparatus, the remote copy between the storage apparatuses, and the replica creation in the storage apparatus. A port 70 is used for connecting to the host system or another storage apparatus. A CPU 72 proactively executes various control processing routines based on the control program 78 of the control memory 76. The cache memory 74 sends and receives data or commands. The data transfer between the first storage apparatus and the second storage apparatus in the remote copy is conducted via the cache memory 74.

Figure 4:
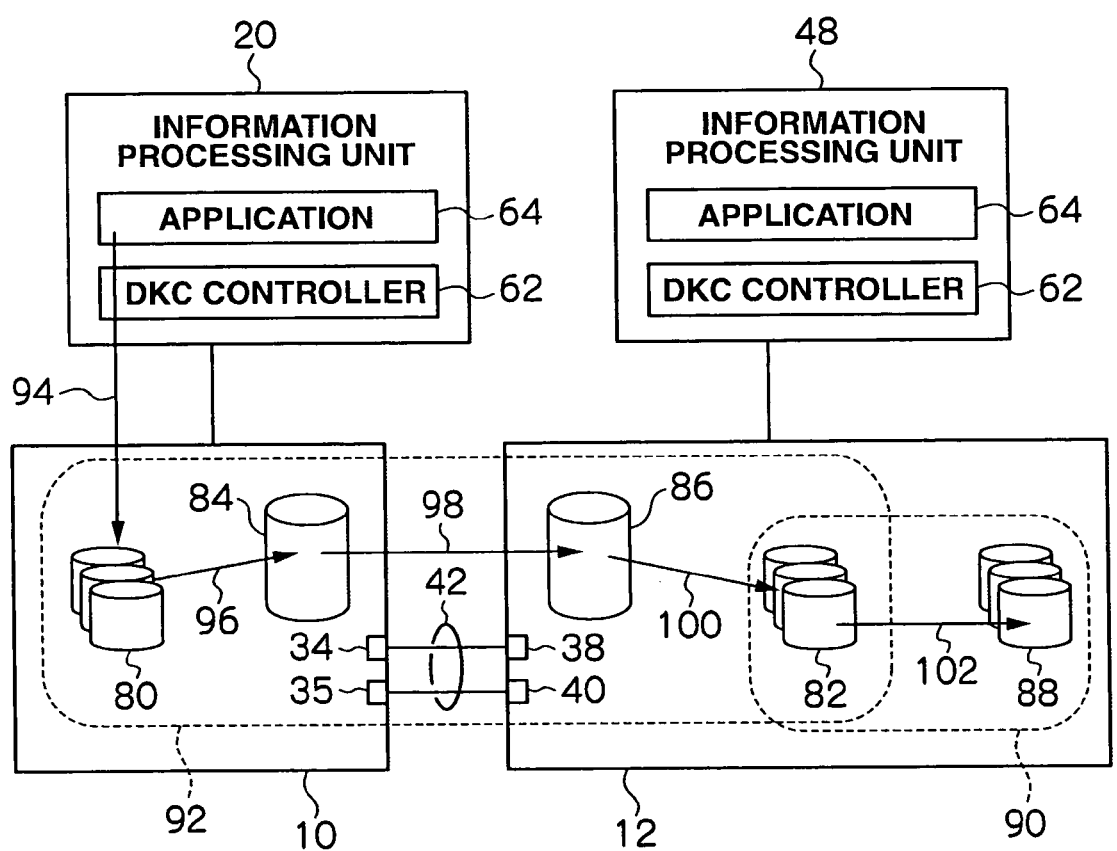
FIG. 4 is a function block diagram showing the connection relation of logical volumes in the system illustrated in FIG. 1.

FIG. 4 is a block diagram for explaining the volume pair used in executing the remote copy performed between the storage apparatus 10 and the storage [apparatus] 12, and the local replication performed in the storage apparatus 12. In FIG. 4, reference numeral 80 represents a primary data volume of the local site-side storage apparatus 10, and reference numeral 82 represents a secondary data volume of the remote site-side storage apparatus 12. The secondary data volume 82 will become a replication of the primary data volume 80.

Reference numeral 84 represents a primary journal volume of the local site-side storage apparatus, and reference numeral 86 represents a secondary journal volume of the remote site-side storage apparatus. Reference numeral 88 represents a replica (backup volume) of the secondary volume 82. The primary journal volume 84 and the secondary journal volume 86 are of a pair relationship, the secondary journal volume 86 and the secondary volume 82 are of a pair relationship, and the secondary volume and the replica 88 are of a pair relationship. As a result of two volumes forming a pair relationship, it is possible to discontinue or resume the transfer of data between two volumes in a pair relationship by splitting or synchronizing these pairs.

When the application program 64 of the host system 20 issues a write I/O 94 to the storage apparatus 10, the channel adapter 18 of the storage apparatus 10 reflects this write data in the primary volume 80. The channel adapter creates the journal data 96 from this write I/O and stores it in the primary journal volume 84.

Journal data is configured from the update data itself issued from the host system 20 to the primary volume 80, position of such updated primary volume (logical address of the primary volume), updated time (time stamp), journal sequence ID and the like. The sequence ID is also a parameter for guaranteeing the time ordering of data as described in the claims. This time ordering is significant in the storage apparatus 12 when performing backup at the designated time and creating a replica.

The journal data stored in the primary journal volume 84 is transferred by the remote copy function 98 to the secondary journal volume 86 of the storage apparatus 12. The channel adapter 37 of the second storage apparatus 12 reads the journal data retained in the primary journal volume 84 asynchronously with the write operation from the host system 20, and stores this in its own secondary journal volume 86.

The channel adapter of the second storage apparatus periodically accesses the secondary journal volume 86, creates update data from the journal data stored in the secondary journal volume, and reflects this update data according to the time stamp and the order of sequence ID in the secondary data volume 82 (100). This reflection is referred to as restoration. Thereby, the secondary data volume 82 of the storage apparatus 12 will possess the same data as the data of the primary data volume 80 of the first storage apparatus.

A replica 88 is created from the secondary data volume 82 by the local replication 102. When the information processing unit 20 (or the information processing unit 48) designates a replica creation timing as a parameter in the storage apparatus 12, it also restores the journal data containing such parameter in the secondary data volume 82. The storage apparatus backs up the secondary data volume 82 storing this journal data in the replica 88.

In FIG. 4, a journal group 92 is formed with the primary data volume 80 and the primary journal volume 84 of the storage apparatus 10, the secondary data volume 82 of the storage apparatus 12, and the secondary journal volume 86.

A journal group is a group for realizing a function of copying the journal data of the local site to the journal volume of the remote site based on remote copy, and the remote site forming a secondary volume that is identical to the primary volume while guaranteeing the time ordering with the remote copied journal. The storage apparatus 10 or the storage apparatus 12 initially copies the primary data volume 80 to the secondary data volume 82, and the subsequent updates from the host system to the primary data volume 80 will be journalized, and the journal data will be reflected in the secondary data volume. The secondary data volume 82 and the replica 88 form a consistency group. A consistency group is used for guaranteeing the time ordering of the replica data.

The volume configuring the journal group and the consistency group is decided by the DKC controller of the host system, and this decision is sent as a command to the storage apparatuses 10 and 12. The channel adapter of the storage apparatus that received this command registers these groups in the control table of the shared memory. The channel adapter refers to the control table and performs remote copy and local replication. The host system provides the foregoing command to the storage apparatus so as to associate the journal group and the consistency group. In FIG. 4, the journal group 92 and the consistency group 90 are made to correspond one-on-one. Thereby, it is possible to reflect the time ordering based on the time stamp of the journal data in the secondary data volume 82, and reflect this as is in the replica corresponding to the secondary data volume 82. Thus, even though there are a plurality of replicas, consistency of the time ordering between the replicas can be maintained.

Figure 5:
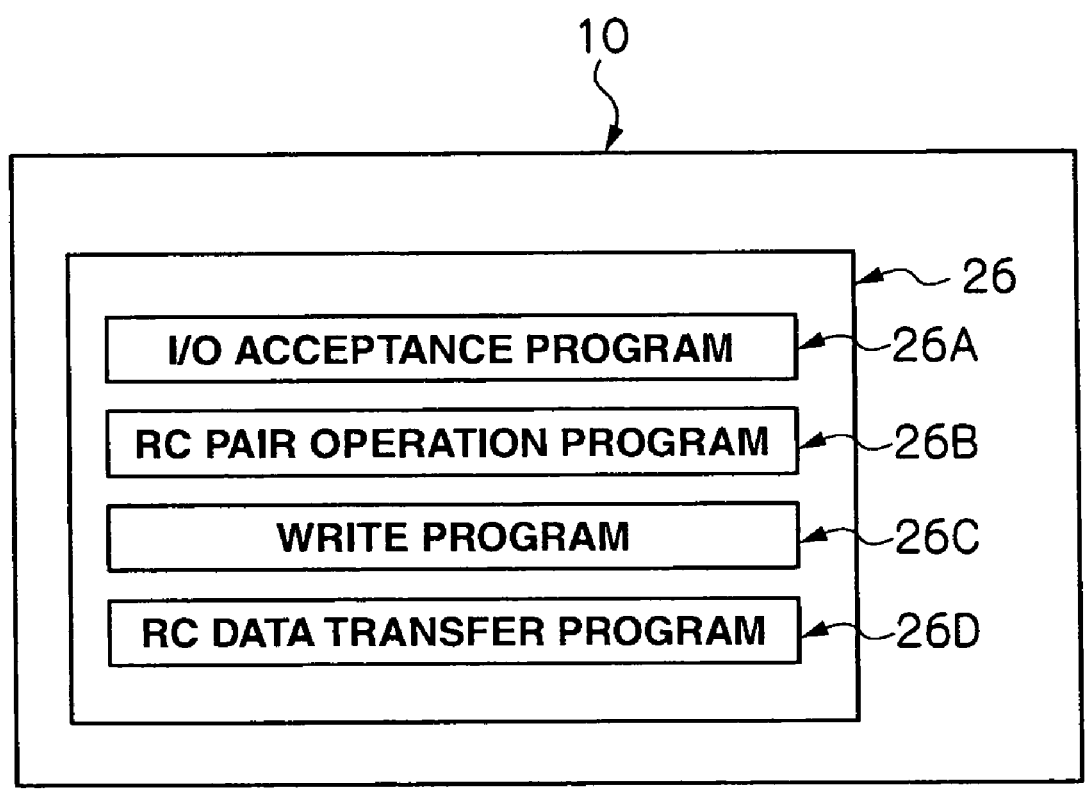
FIG. 5 is a function block diagram showing a program configuration of the host system.

FIG. 5 is a block diagram showing a program for realizing the remote copy illustrated in FIG. 4. The shared memory 26 of the storage apparatus 10 stores an I/O acceptance program 26A, a remote copy (RC) pair operation program 26B, a write program 26C, and a remote copy data transfer program 26D.

Each program is executed by the channel controller 18 and/or the channel controller 22 of the storage apparatus. Incidentally, these programs may also be stored in the local memory 76 of the channel controller. Further, this information may also be stored in the volume 32 configured from the storage extent of the hard disk drive 30.

The I/O acceptance program 26A is a program for executing processing to receive data to be written from the host system 20 in the logical volume 32. The remote copy pair operation program 26B is a program for executing processing to receive a pair operation command from the host system 20, and perform operation (pair operation) for creating a remote copy pair.

A pair is defined with a control table, and the storage apparatus 10 receives a pair operation command from the host system 20 to create and register a pair in the shared memory. The storage apparatus 10 allocates its own logical volume to the pair. When the storage apparatus 10 determines that there is no logical volume to be allocated to the pair, the storage apparatus 10 creates a new logical volume and allocates it to the pair.

The storage apparatus 10 refers to the control table concerning the pair and performs remote copy to the storage apparatus 12. Here, in view of FIG. 4, a pair is the pair formed by the primary data volume 80 and the secondary data volume 82.

The write program 26C is a program for storing the write data received by the I/O acceptance program 26A in the primary volume 80. The remote copy data transfer program 26D is a program for forming a journal from data to be written from the host system 20 in the logical volume 32 of the storage apparatus 10, storing the journal in the primary journal volume 84, and thereafter transferring this to the secondary journal volume 86 of the storage apparatus 12.

Figure 32:
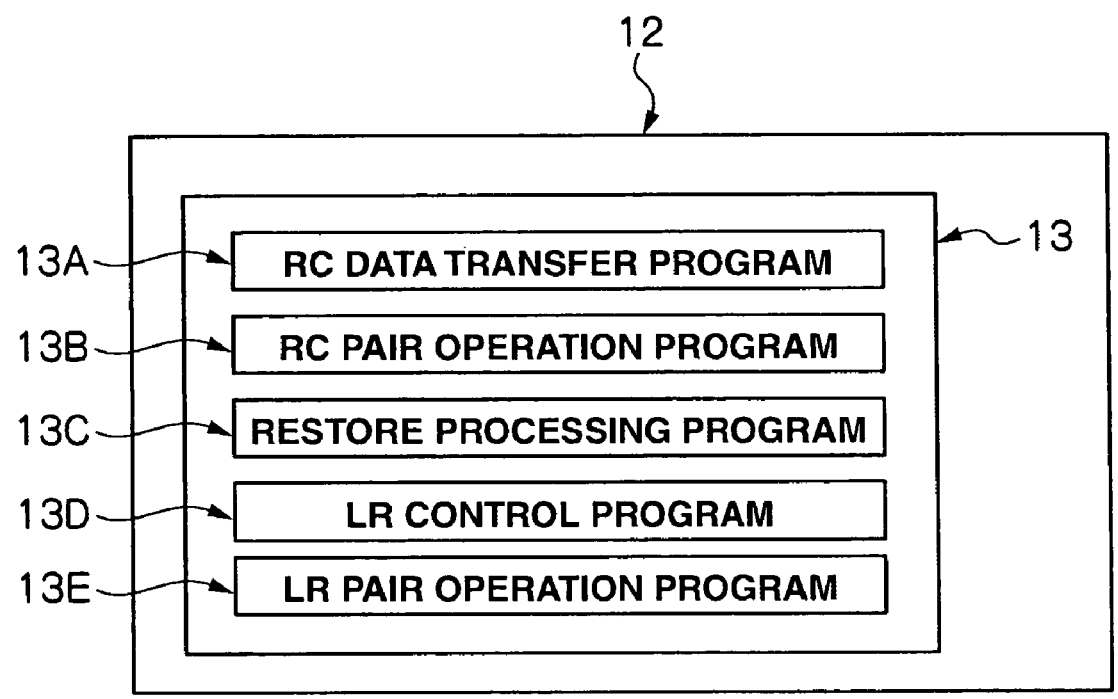
FIG. 32 is a function block diagram showing a program configuration of a storage apparatus for realizing remote copy and backup.

FIG. 32 is a block diagram showing the configuration of a program for the storage apparatus 12 to realize the remote copy function and the replica creation function. The shared memory 13 of the storage apparatus 12 stores a remote copy data transfer program 13A, a remote copy pair operation program 13B, a restore processing program 13C, a replica function control program 13D, and a replica pair operation program 13E.

The remote copy data transfer program 13A is a program for executing processing to receive journal data transferred from the storage apparatus 10. The remote copy pair operation program 13B is a program for executing processing to receive the pair operation command issued from the host system 20 (or the host system 48), and create a pair based on asynchronous remote copy.

The restore processing program 13C is a program for executing processing to restore the journal data received by the remote copy data transfer program 13B from the secondary journal volume 86 to the secondary data volume 82 based on a parameter such as the time stamp of journal data.

The storage apparatus 12 uses the local replication function to create the replica 88 as a backup volume from the secondary volume 82. The local replication function is executed by the replica (LR) control program 13D and the replica pair operation program 13E. The replica control program 13D is a program for executing processing to back up the data written in the secondary volume 82 into the replica 88 based on the replica pair control table.

The replica pair operation program 13E is a program for executing processing to control the pair formed from the secondary volume 82 to be backed up and the replica 88 in order enable backup at the user's desired time by using the time stamp of the secondary journal volume 86. Incidentally, the control table of the storage apparatus 12 contains pair information between the secondary journal volume 86 and the secondary volume 82 in addition to the pair information between the secondary volume 82 and the backup volume 88.

When the storage apparatus 12 is to create a replica at a certain point in time, restoration between the secondary journal volume 86 and the secondary volume 82 is controlled with a time stamp of the journal data. When the host system reserves a backup acquisition time in the storage apparatus 12, the program of the storage apparatus 12 stops the restoration from the secondary journal volume 86 to the secondary data volume 82 at that time, and immobilizes data of the secondary volume 82. The storage apparatus backs up the secondary volume 82 with the guaranteed data in the replica 88. Specific examples will be described later.

The disadvantages of configuring the secondary journal volume from a cache memory are now explained. If the remote copy from the storage apparatus 10 to the storage apparatus 12 is continued while the restore processing to the secondary data volume 82 is being stopped, the cache memory of the storage apparatus 12 will become full because the capacity of a cache memory is small, and data can no longer be copied. This may result in the loss of transaction. Thus, when creating a replica at the remote site, it is necessary to stop the remote copy. Since much time is usually required to create a replica, there is a possibility that the remote copy will be stopped for a long time.

Contrarily, the remote copy system illustrated in FIG. 1 allocates the logical volume 32 supplied from the hard disk drive 30 to the secondary journal volume 86. Since it is possible to allocate a high-capacity logical volume to the secondary journal volume, the replica creation processing is performed at the remote site, and the system will be able to continue the remote copy even when the restore processing of journal data to the secondary volume is being stopped.

The capacity of the secondary journal volume may be decided upon estimating the journal data volume required during the creation of a replica. Although this will depend on the mode of operating the remote copy, for instance, if a replica is to have a capacity capable of storing a journal data volume all day and all night, this would be roughly 3,000 GB. Incidentally, the primary journal volume 84 of the storage apparatus 10 may be configured from a storage extent of the cache memory in addition to the logical volume 32 based on the hard disk drive 30.

Figure 6:
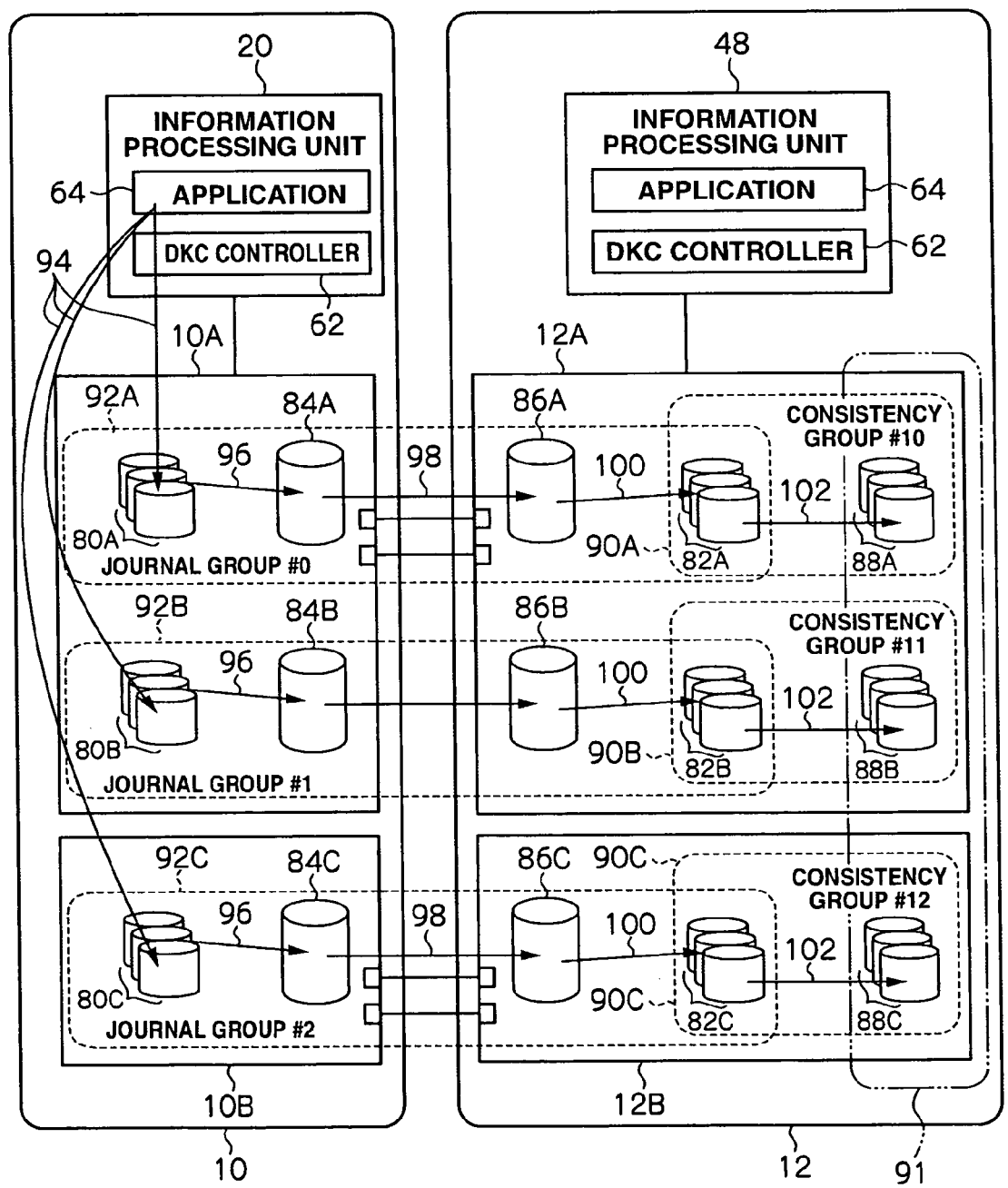
FIG. 6 is a block diagram showing an expanded example of the connection relation of the logical volumes illustrated in FIG. 4.

FIG. 6 is a block diagram showing an expanded example of the configuration of the volume illustrated in FIG. 4. With the system illustrated in FIG. 4, one storage apparatus at the local site and one storage apparatus at the remote site were associated to configure the system of remote copy and local replication. As described above, one journal group and one consistency group were linked.

The system illustrated in FIG. 6 differs from the system depicted in FIG. 4 in that the local site and the remote site are both configured from a plurality of storage apparatuses, and a plurality of pairs of the journal group and the consistency group are formed between the local site and the remote site.

The local site is configured from storage apparatuses 10A and 10B. The remote site is configured from storage apparatuses 12A and 12B. The storage apparatus 10A is connected to the storage apparatus 12A, and the storage apparatus 10B is connected to the storage apparatus 12B.

Journal groups 92A and 92B are formed in the storage apparatus 10A and the storage apparatus 12A, and a consistency group 90A is provided to the journal group 92A so as to correspond one-on-one, and a consistency group 90B is provided to the journal group 92B so as to correspond one-on-one. The journal group 92C and the consistency group 90C corresponding one-on-one are also provided to the storage apparatus 10B and the storage apparatus 12B. The relationship of the journal group and the consistency group illustrated in FIG. 6 is defined by the control table stored in the shared memory of the storage apparatuses 10A, 10B, 12A, 12B.

One combination of the journal group and the consistency group correspond to one business task. For instance, on the assumption that the local site and the remote site are systems of a financial institution, the first combination may be for business tasks directed to individual customers, and the second combination may be for corporate customers. Incidentally, when the financial institution needs to start a new business task and it cannot be processed with the existing storage apparatuses, as shown in FIG. 6, both the local site and the remote site need to install more storage apparatuses, respectively. Reference number 10B represents a storage apparatus additionally installed at the local site, and reference number 12B represents a storage apparatus additionally installed at the remote site.

A time stamp in the same time axis is affixed to the host system I/O 94 to be issued from the host system to the primary data volume (80A, 80B, 80C) of each journal group. When the storage apparatuses 12A, 12B are to create a replica for each group, they perform processing for restoration from the secondary journal volume (86A, 86B, 86C) to the secondary data volume (82A, 82B, 82C) according to this time stamp, and processing for creating the replica (88A, 88B, 88C) from the secondary data volume. Therefore, it is possible to create a replica ensuring temporal consistency across a plurality of consistency groups beyond each consistency group. To put it differently, even when storage apparatuses are additionally installed at the local site and the remote site, it is possible to create a backup with guaranteed temporal consistency.

Incidentally, as with the system illustrated in FIG. 4, a plurality of primary data volumes and secondary data volumes exist in each group, respectively. One primary data volume corresponds to one secondary data volume. A plurality of replicas are also provided to each group to match the secondary data volumes. A journal volume exists in each group as a unitary volume. The backup of data is performed for each consistency group. Therefore, even if a plurality of backup volumes exist in the consistency group, it is not possible to change the backup timing in the same group. When changing the backup timing, the consistency group should be divided among a plurality of backup volumes.

FIG. 7 shows a remote copy pair control table as one control table to be used when the storage apparatus 10 performs remote copy with the storage apparatus 12. The storage apparatus 10 at the local site refers to this control table and performs remote copy from the copy source volume to the copy destination volume. In the foregoing example, the primary journal volume is the copy source volume, and the secondary journal volume is the copy destination volume.

The storage apparatus 10 receives a pair operation command from the host system and creates this table in the shared memory. When the channel controller 22 of the storage apparatus 10 is to execute remote copy, it refers to this control table and recognizes the pair status of both the copy source volume and the copy destination volume.

A volume # is an identification number of the primary data volume, a copy destination apparatus # is an identification number of the storage apparatus 12 configuring the remote site, a copy destination volume # is an identification number of the secondary data volume, a journal group # is an identification number for identifying the journal group, and a pair status shows the pair status between the primary volume and the secondary volume.

The shared memory 26 of the storage apparatus 12 stores a similar control table, but registers identifying information of the storage apparatus 10 as the copy source apparatus instead of the copy destination apparatus. The storage apparatus 12 processes remote copy according to the control table.

As the status of the pair formed from the primary data volume and the secondary data volume, there is "Simplex", "Duplex", "Suspend", "Duplex-Pending", and "Suspending". "Simplex" is a status where remote copy has not been started between the primary data volume and the secondary data volume. "Duplex" is a status where both volumes are in synch. In other words, this is a status where data is remote copied from the primary data volume to the secondary data volume when data is being written from the host system to the primary volume.

"Suspend" is a status where the remote copy between the primary data volume and the secondary data volume is suspended or stopped. The pair relationship of both volumes is maintained.

"Suspending" is a status for the period of making a transition from the "Duplex" status to the "Suspend" status. In the "Suspending" status, data that has not yet been copied from the primary data volume to the secondary data volume is reflected from the primary data volume to the secondary data volume. "Duplex-Pending" is a status for the period of making a transition from the "Simplex" status or the "Suspend" status to the "Duplex" status. In the "Duplex-Pending" status, data stored in the primary data volume is copied to the secondary data volume in order to make data of the primary data volume and data of the secondary data volume coincide. After the uniformity of data of the primary data volume and data of the secondary data volume is guaranteed, the pair status is changed to a "Duplex" status.

FIG. 8 shows a journal group management table. This table registers the number of volumes configuring a journal volume for each journal group, an identification number (volume #) of each volume, a storage capacity (size) of the volumes, and the journal start position and journal end position in the journal volume. The control table illustrated in FIG. 8 is stored in the respective shared memories of the storage apparatuses 10 and 12. This management table is created by each storage apparatus based on a journal registration command issued from the host system.

FIG. 9 shows a replica function pair management table for controlling the local replication in the storage apparatus 12. The channel controller 37 of the storage apparatus refers to this management table and creates a replica from the secondary data volume. The storage apparatus 12 creates this control table upon receiving a command from the host system 20 or 48, and thereafter registers this in the shared memory.

In the management table illustrated in FIG. 9, the volume # is an identification number of the secondary data volume of the remote copy as the copy source, and the copy destination volume # is a replica of the backup volume. The consistency group # is an identification number of the consistency group to which the copy source volume and the copy destination volume belong.

FIG. 10 and FIG. 11 show copy group management tables of the host system. The host system is able to recognize the journal group or consistency group, or the volumes belonging to these groups by referring to these tables, and issue a command for executing the remote copy of the storage apparatus, or executing the creation of replicas.

FIG. 10 is a control table showing the copy group of the remote copy and local replication, and contains the copy type of whether it is a remote copy or replica, number of pair volumes belonging to the copy group, ID of the local DKC (storage apparatus at the local site), ID of the remote DKC (storage [apparatus] at the remote site), and ID (group #) given to the group.

With reference to the system illustrated in FIG. 6, the group of name A is the journal group 92A, the group of name B is the journal group 92B, the group of name C is the journal group 92C, the group of name D is the consistency group 96A, the group of name E is the consistency group 96B, and the group of name F is the consistency group 96C. DKC-A is the storage apparatus 10A, DKC-B is the storage apparatus 10B, DKC-C is the storage apparatus 12A, and DSC-D is the storage apparatus 12B.

For example, the copy group A and copy group D are given the same group ID (0x00). Thereby, as shown in FIG. 6, the host system is able to make the journal group 92A and the consistency group 90A correspond one-on-one.

FIG. 11 shows a management table of a volume pair belonging to the copy group A. The local volume # is a primary data volume ID, and the remote volume # is a secondary data volume ID. As shown in FIG. 4, the journal group 92A contains a plurality of primary data volumes and a plurality of secondary data volumes. The table illustrated in FIG. 11 shows the correspondence of each primary data volume and secondary data volume. This management table is provided to each copy group.

FIG. 12 shows a control table for prescribing the copy group set (container) in which the consistency of data is to be guaranteed. The name AA represents a container formed from the copy group A, B, C and the name BB represents a container formed from the copy groups D, E, F illustrated in FIG. 10. As a result of the host system designating the backup time in container units, it is possible to perform backup at the same time in container units beyond groups.

Figure 13:
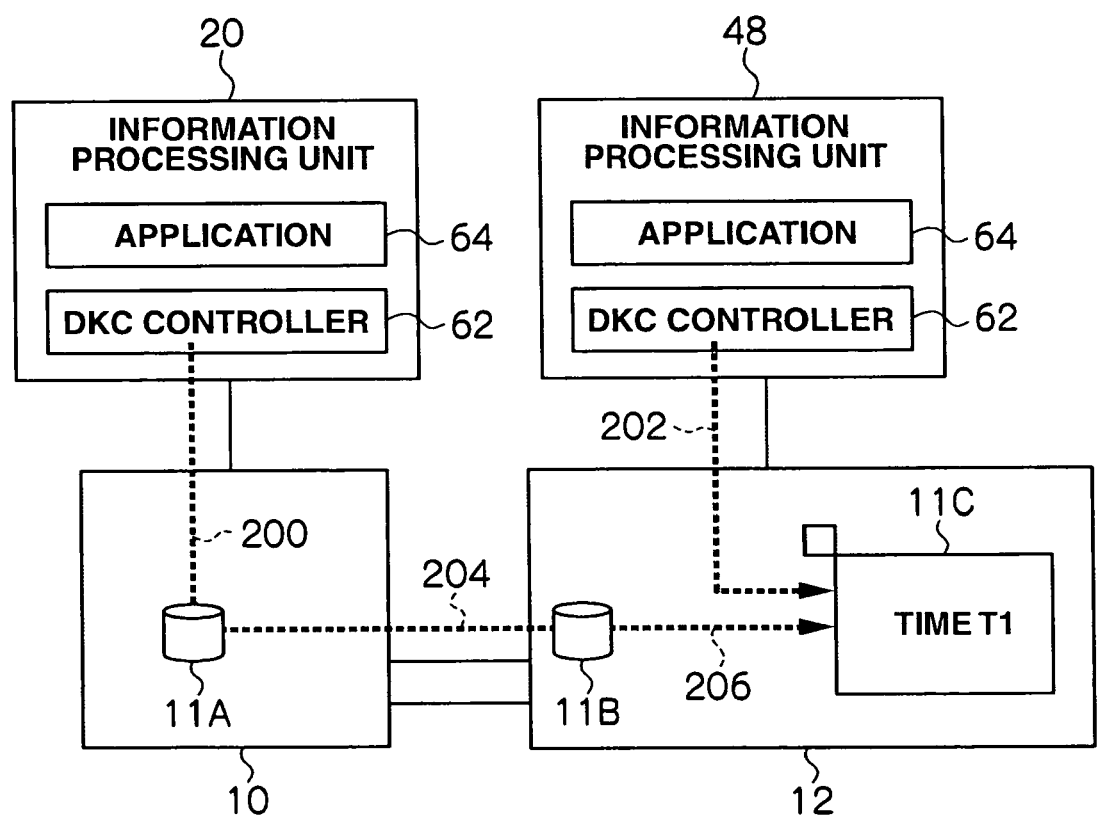
FIG. 13 is a block diagram of the remote copy system for realizing the backup acquisition operation based on time designation.

Details of the backup are now explained. FIG. 13 is a schematic diagram of the remote copy system for performing backup. The host system 20 or the host system 48 notifies a command designating backup to the storage apparatus 10 or 12. Designation of the backup time from the host system is provided to the storage apparatus in the form of an "At Time Split" command. "At Time Split" is a command of stopping the restoration from the secondary journal volume 86 to the secondary data volume at the designated time, and re-synchronizing the secondary data volume 82 and the replica volume. While the restoration from the secondary journal volume 86 to the secondary data volume is being executed, the status between the secondary data volume and the replica will become a split status.

Reference numeral 202 is a command to be notified from the host system 48 to the storage apparatus 12. The command is issued from the DKC controller 64. The command is stored in the backup time reservation management table 11C of the shared memory. When the command 200 is issued from the host system 20 at the local site, the command device 11A of the storage apparatus 10 stores the command, and stores the stored command 204 in the command device 11B of the storage apparatus 12. The storage apparatus 12 receives the command from the command device 11B and registers the backup reservation time in the backup time reservation management table 11C. A command device is a storage extent for storing commands.

Figure 14:
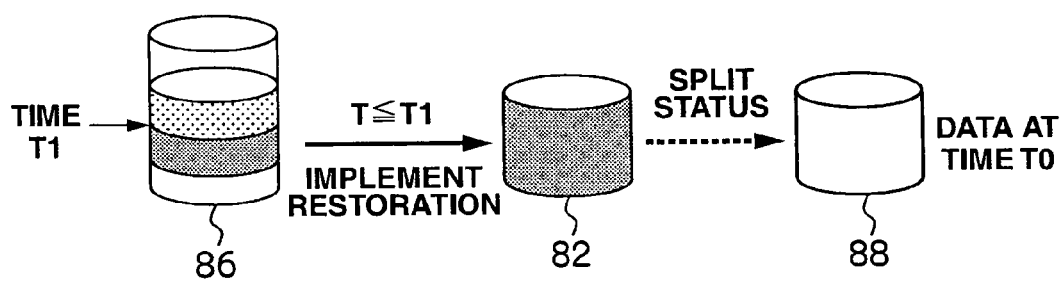
FIG. 14 is a system block diagram showing the partial process on restoration control between volumes and split/re-synch control between volumes upon performing time designated backup.

FIG. 14 to FIG. 17 are diagrams showing the sequential flow for the storage apparatus 12 to create a backup at the future time (T1) designated by the host system. As shown in FIG. 14, when the time stamp time (T) of the journal during restore processing does not become time (T1), the storage apparatus 12 continues restoring the journal data from the secondary journal volume 86 to the secondary data volume 82.

The pair status between the secondary data volume 82 and the replica 88 is "Split" (split). Backup data at the previous backup time T0 is recorded in the replica 88.

Figure 15:
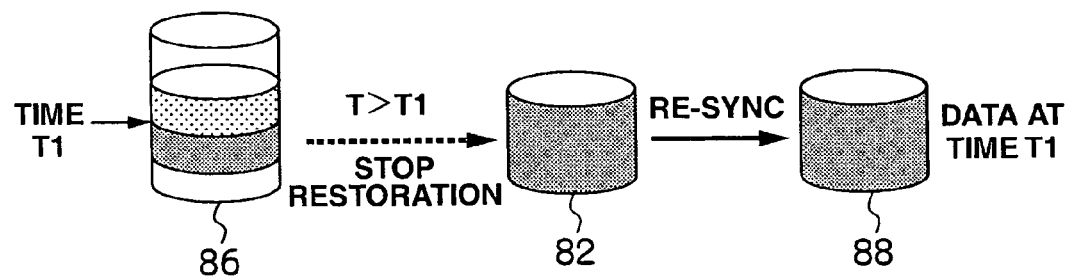
FIG. 15 is a system block diagram showing the stage subsequent to FIG. 14.
Figure 16:
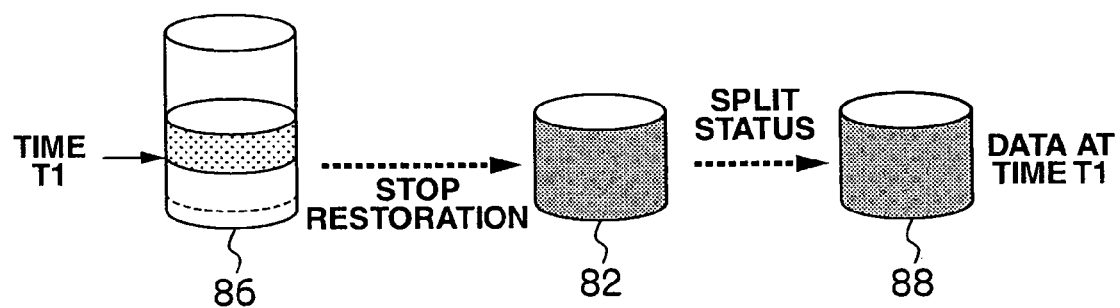
FIG. 16 is a system block diagram showing the stage subsequent to FIG. 15.

Subsequently, as shown in FIG. 15, when the time stamp time (T) of the journal during restore processing passes the reservation time (T1), and the restore processing program of the storage apparatus 12 detects journal data from time T1 or later, it stops the restoration from the secondary journal volume 86 to the secondary data volume 82. Further, the storage apparatus changes the pair status between the secondary data volume 82 and the replica 88 from a split status to a resynchronized status ("Resync"). Thereby, difference in data from time T0 to time T1 is copied from the secondary data volume 82 to the replica 88. A backup of the secondary data volume at time T1 is formed in the replica 88. When this difference copy is complete, the secondary data volume 82 and the replica 88 will become a split status. Restoration is stopped until this split status is complete (FIG. 16).

Figure 17:
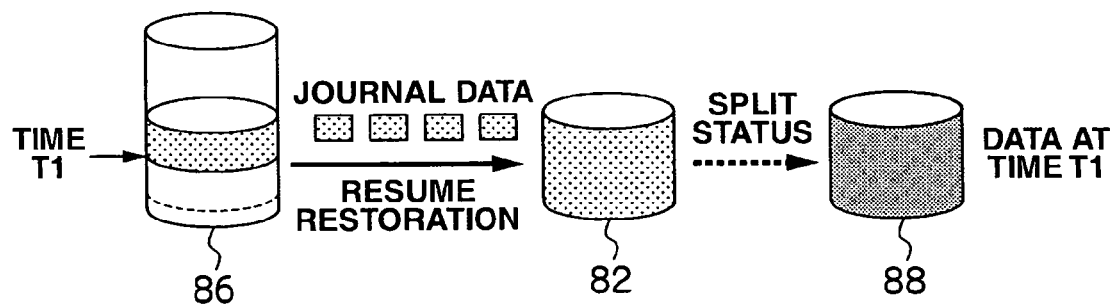
FIG. 17 is a system block diagram showing the stage subsequent to FIG. 16.

When the split between the secondary data volume 82 and the replica 88 is complete, restoration of journal data from the secondary journal volume 86 to the secondary data volume 82 at time T1 onward is resumed (FIG. 17).

From the start to finish of the backup explained in FIG. 14 to FIG. 17, the remote copy of journals from the primary journal volume 92 to the secondary journal volume 84 is continued. The storage apparatus 12 sequentially stores the journal data during the period that restoration is stopped in the secondary journal volume. The journal data restored from the secondary journal volume to the secondary data volume is deleted (purged) from the secondary journal volume.

Incidentally, in substitute for the example illustrated in FIG. 17, it is also possible to execute a mode of where the storage apparatus 12 does not resume restoration. Or the configuration may be such that the user of the host system is able to select the mode for resuming restoration or the mode for continuing to stop restoration. The host system provides the user with an operational opportunity based on GUI. The advantage of continuing to stop restoration is to allow the storage apparatus to create a replica at the subsequent backup reservation time.

FIG. 18 shows a backup time reservation management table. When the host system sends an "At Time Split" command to the storage apparatus 12, the storage apparatus 12 creates this management table and stores it in the shared memory. The storage [apparatus] 12 refers to this management table upon performing backup processing.

In the reservation management table, the backup reservation time can be set sequentially in the replica for each generation. As an example, generation #1 is backed up at 11:00, generation #2 is backed up at 12:00, and generation #3 is backed up at 13:00. FIG. 14 to 17 are diagrams showing only the backup of generation #1 (11:00).

In order to maintain the consistency of backup, it is preferable that only one reservation can be made simultaneously to one consistency group. In order to enable the reservation of a plurality of generations regarding one journal group, it is possible to allocate a separate consistency group to the journal group, and register this as a reservation for the second generation onward. For instance, it is possible to link up to three consistency groups to one journal group. The host system is able to set a reservation time for each of the total of three combinations of the journal group and the respective consistency groups.

As information required for performing backup, a consistency group ID, pair status between the replica primary volume (remote copy secondary data volume) and the replica secondary volume, reservation time, acceptance time of backup reservation, and time-out time are registered in the management table. The ID of the journal group to be linked to the consistency group is also registered.

A generation flag is a flag for prescribing whether to make the backup reservation valid or invalid. Although this flag is set because backup is usually required, this flag may be reset when canceling or discontinuing backup.

A restore processing mode corresponds to the restore processing status between the secondary journal volume and the remote copy secondary volume. If the restore processing mode is "boot", this shows a status where the restore processing is to be executed. If the restore processing mode is "stop", this shows a status where restoration should be stopped. A pair status shows the pair status between the replica primary volumes (remote copy secondary volume and replica secondary volume), and the example illustrated in the management table shows that the pair status of both volumes is "Split".

The storage apparatus 12 determines whether the command from the host system corresponds to the forbidden conditions of backup based on the management program, and, when the command corresponds to a forbidden condition, the storage apparatus rejects the command and returns it to the host system. For example, this would be when the logical volume designated by the reservation setting command is not a secondary data volume to be subject to remote copy, or when the logical volume designated by the reservation setting command is not a primary volume in local replication, or when a backup reservation has already been set in the consistency group to be reserved, or when three reservations have already been made to the same journal group. Incidentally, in FIG. 4, the volume 82 is a secondary volume in remote copy as well as a primary volume in local replication. When the copy source volume in local replication is the secondary volume in remote copy, but not the primary volume in local replication, the storage apparatus 12 may return the reservation setting command from the host system. Whether the reservation setting command corresponds to a forbidden condition can be determined by the storage apparatus referring to the control table described above.

Figure 19:
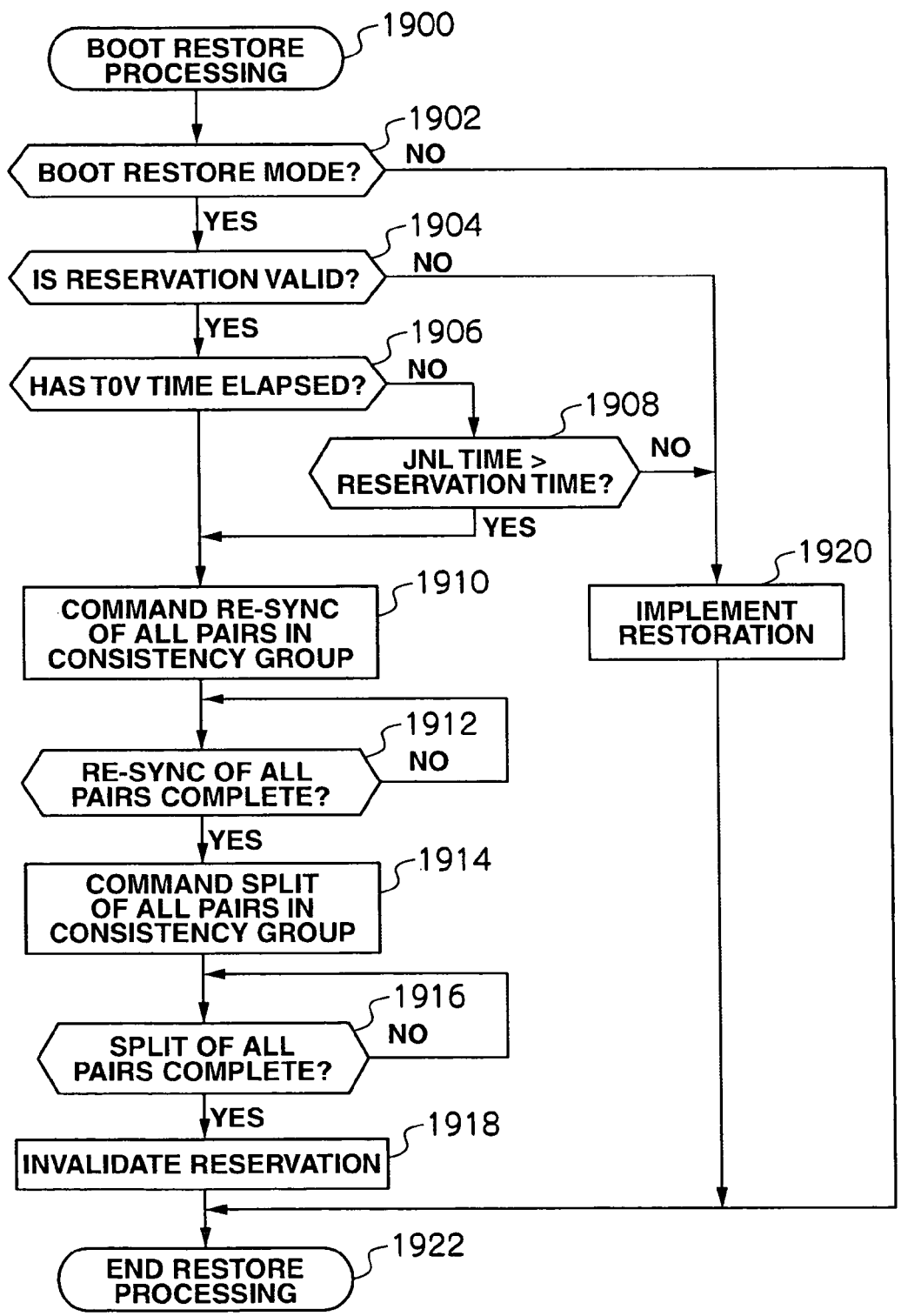
FIG. 19 is a flowchart showing the operation for restoring journal data in a secondary volume.

The host system is able to issue a confirmation command of the reservation setting status to the storage apparatus. The storage apparatus that received this command refers to the reservation confirmation table and replies to the command from the host system. The host system may issue a reservation release command to the storage apparatus. Nevertheless, in a case when the reserved backup is being executed by the storage apparatus, the storage apparatus rejects the reservation release command and returns it to the host system. During the process of performing the processing illustrated in FIG. 14 to FIG. 18, the storage apparatus 12 executes the restore processing program depicted in FIG. 19. The storage apparatus repeatedly executes the flowchart shown in FIG. 19 at a prescribed timing to determine the necessity of restoration.

When the storage apparatus boots the restore processing, it checks whether the restore mode is in a boot status (1900). When the storage apparatus denies this determination, it ends the restoration (1922). When the storage apparatus affirms this determination, it proceeds to the subsequent step and detects whether the backup reservation time is valid based on a generation flag (1904).

When the storage apparatus determines that the flag is invalid, it restores data among the journal data in the secondary journal volume 86, which is not reflected in the secondary data volume 82, to the secondary data volume 82 (1920).

Subsequently, the storage apparatus determines whether the time elapsed from the reservation time has passed the time-out time (1906). The time-out time, as shown in FIG. 18, is set in the reservation management table.

The time-out time is now explained. As explained with reference to FIG. 15, when the backup reservation time is set to T1, the storage apparatus continues the restore processing until it discovers journal data having a time stamp of time T1 or later. Assuming that there is no journal data of time T1 or later, if a time-out time is not set, the storage apparatus will not be able to stop the restore processing and proceed to the step of creating a backup at time T1. The time-out time is decided arbitrarily in view of the operation of the storage apparatus. FIG. 18 shows an example of the time-out time where 60 minutes is registered in the management table. As a result of the time-out time being set in the control table, it is possible to promptly and reliably start the backup processing even if the journal data of time T1 or later is not input to the secondary journal volume 86.

When the time-out time has not elapsed, the storage apparatus reads the time stamp of the latest journal data from the secondary journal volume 86, and determines whether the time stamp (JNL time) is after the reservation time (1908). When the time of the journal data is before the reservation time, restore processing is performed (1920).

When the time of the journal data is after the reservation time, the storage apparatus commands the pair management program to re-synch the secondary data volume and the replica of each pair regarding all volume pairs belonging to the consistency group (1910). The storage apparatus determines whether the foregoing re-synchronization is complete (1912). Thereby, the backup of volumes in a pair relationship will be complete.

When the storage apparatus completes the backup, it commands the splitting of volumes regarding all pairs (1914), and checks whether the split of all pairs is complete (1916). When the split of all pairs is complete, the storage apparatus invalidates the backup reservation; that is, it resets the generation flag of the management table (1918), and ends the restore processing.

A system of causing the storage apparatus 12 to normally stop the restoration from the secondary journal volume 86 to the secondary data volume 82, and perform backup based on the time designated from the host system is now explained with reference to FIG. 20 to FIG. 22.

Figure 20:
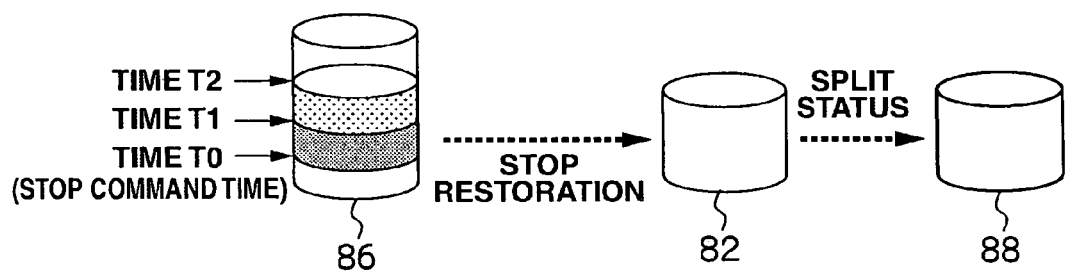
FIG. 20 is a system block diagram showing an embodiment separate from the system illustrated in FIG. 4 pertaining to a partial process on restoration control between volumes and split/re-synch control between volumes upon performing time designated backup.

In FIG. 20, the storage apparatus 12 received a command from the host system to normally stop the restore processing. Restoration will be stopped at the stop designated time T0 or later. The secondary journal volume 86 cumulatively stores journal data having a time stamp of the stop designated time or later. During this time, the pair of the secondary data volume 82 and the replica 88 is in a split status. The replica stores backup data up to the previous reservation time.

Figure 21:
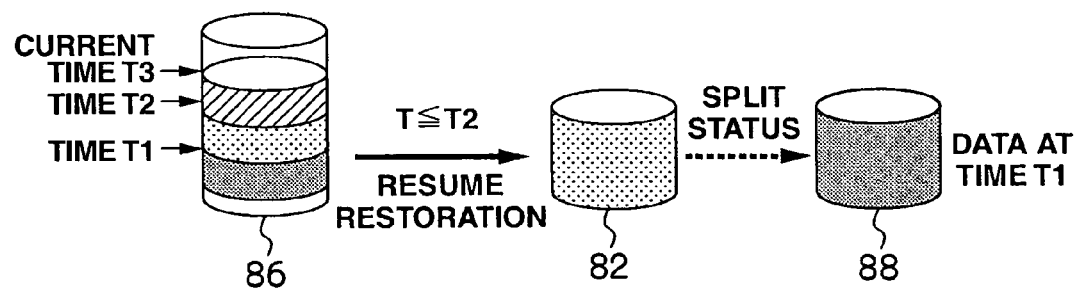
FIG. 21 is a system block diagram showing the stage subsequent to FIG. 20.

When the host system reserves time T2, which is older than the current time, and issues a backup command to the storage apparatus, the storage apparatus 12 resumes the restoration from the secondary journal volume 86 to the secondary data volume 82 (FIG. 21). The storage apparatus 12 continues the restoration until it discovers journal data of time T2 or later.

Figure 22:
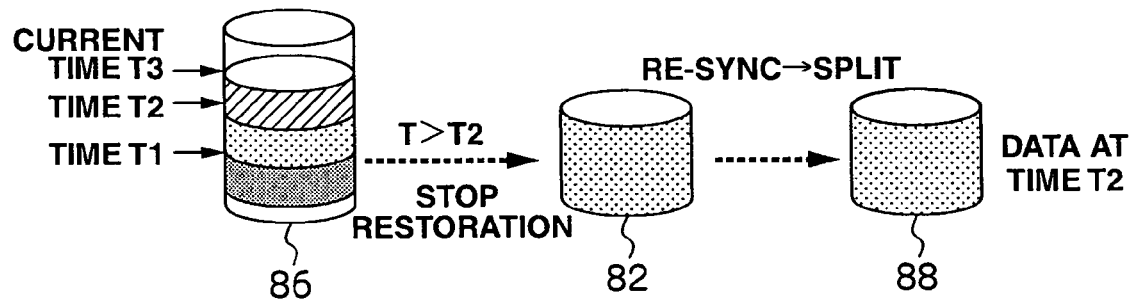
FIG. 22 is a system block diagram showing the stage subsequent to FIG. 21.
Figure 23:
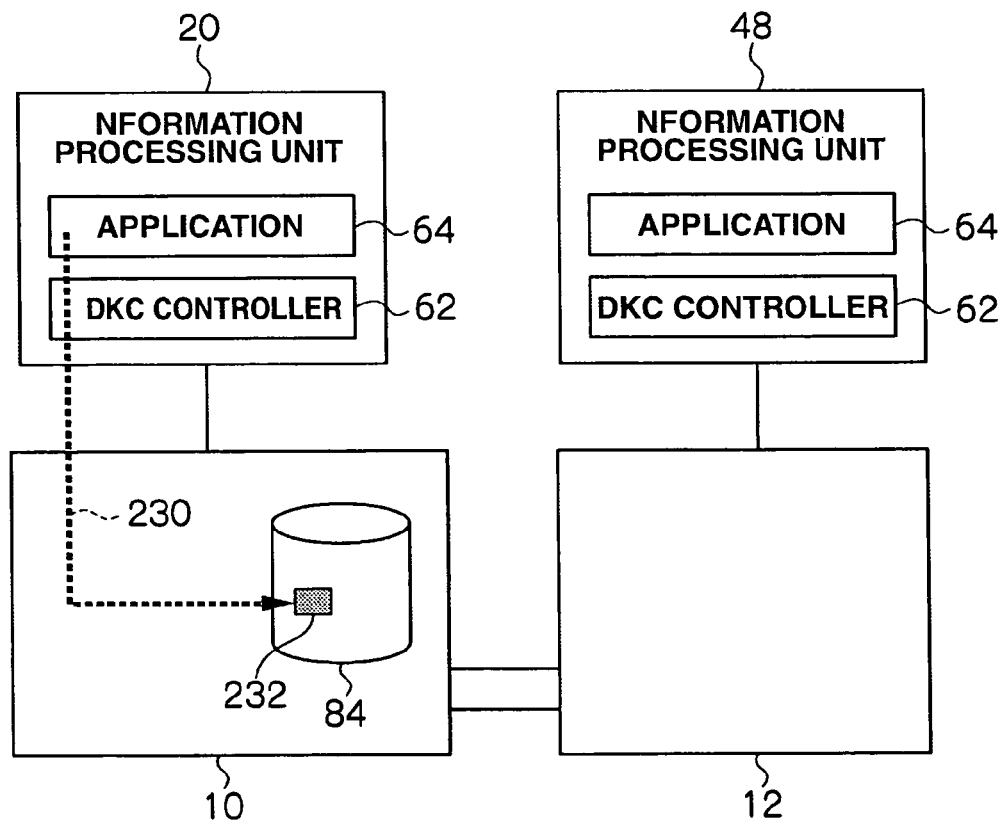
FIG. 23 is a block diagram of a remote copy system showing another embodiment pertaining to another backup processing routine.

Subsequently, when the storage apparatus detects journal data of time T2 or later, as shown in FIG. 22, it stops the restoration, re-synchronizes the secondary data volume 82 with the replica volume, and backs up the data up to time T2 in the replica function secondary volume. Thereafter, the storage apparatus makes the pair formed from both volumes a split status.

Incidentally, when the capacity of journal data stored in the secondary journal volume reaches the maximum capacity of the secondary journal volume, the storage apparatus 12 may "Split" or "Suspend" the secondary journal volume 86 from the primary journal volume 84 to prevent the journal data from entering the secondary journal volume. Further, the storage apparatus 12 may also allocate a new storage extent or a storage resource to the secondary journal volume, and dynamically increase the substantial capacity of the secondary journal volume.

FIG. 23 to 27 are diagram for explaining a system to be applied to a host system without a function of appending a time stamp on journal data. Unlike a mainframe host system, an open host system does not have a time stamp function to be used when writing data in the storage apparatus. Thus, a command 230 for creating a marker journal 232 at a desired timing of creating a backup in link with the application of the host system is issued to the primary journal volume 84 at the local site.

When the local site-side storage apparatus 10 receives this command, it creates a marker journal 232 at the timing of receiving the command and stores such marker journal 232 in the primary journal volume 84. Since a marker journal is stored in the primary journal volume at the timing in which the marker journal was created, the remote site-side storage apparatus 12 is able to gain an understanding of the backup timing based on the marker journal. The host system is also able to set the backup timing in the storage apparatus 12 based on the marker journal. Incidentally, the reason the application 62 of the host system creates the marker journal is because, when there are a plurality of storage apparatuses at the local site, it is necessary to guarantee the ordering of marker journals among the plurality of storage apparatuses. When a marker journal is allowed to be created in each of the plurality of storage apparatuses, there is a possibility that the storage apparatuses will not be able to coordinate the ordering of the marker journals.

Figure 24:
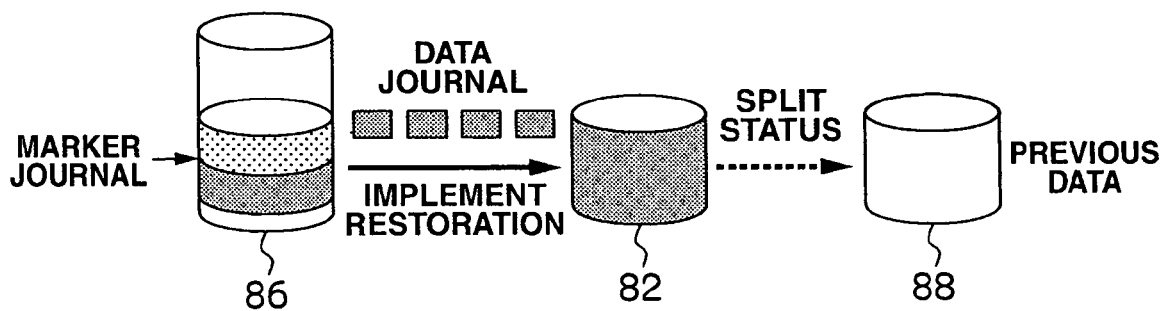
FIG. 24 is a system block diagram pertaining to a partial process on restoration control between volumes and split/re-synch control between volumes upon performing backup using a marker journal.

As shown in FIG. 24, the storage apparatus continues restoration until the storage apparatus 12 detects a marker journal. Here, the secondary data volume 82 is split from the replica 88. The replica stores backup data of a timing based on the previous marker journal.

Figure 25:
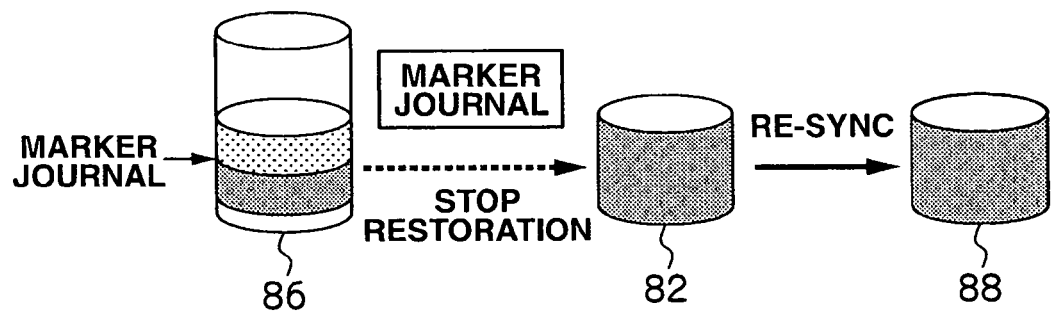
FIG. 25 is a system block diagram showing the stage subsequent to FIG. 24.

As shown in FIG. 25, when the storage apparatus 12 detects a new marker journal during the process of sequentially analyzing the journal data of the secondary journal volume 86, it stops the restoration and re-synchs the secondary data volume 82 with the replica. The secondary data volume 82 stores the journal data up to this marker journal. Therefore, the replica will back up data of the secondary data volume up to this marker journal.

Figure 26:
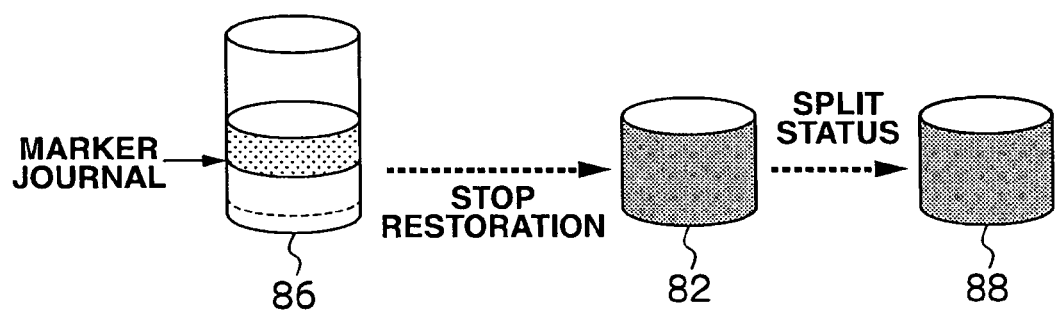
FIG. 26 is a system block diagram showing the stage subsequent to FIG. 25.

As shown in FIG. 26, when the storage apparatus 12 finishes the backup copy, it makes the pair status of the secondary data volume 82 and the replica a split status. Incidentally, although this also applies to the foregoing system, any change to the pair status of the volume pair is reflected in the control table.

Figure 27:
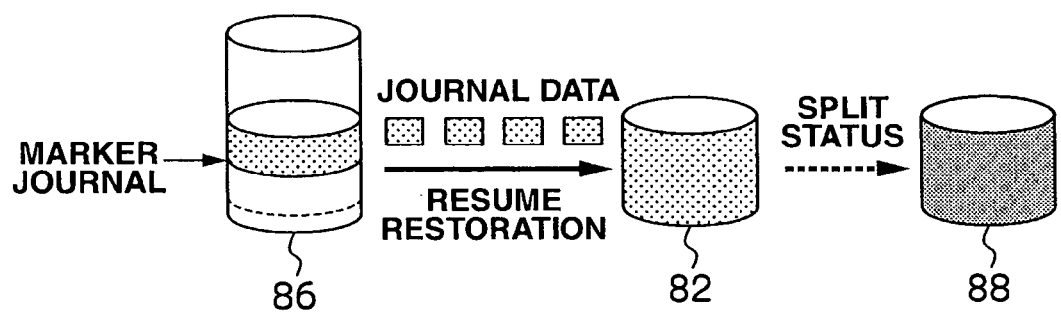
FIG. 27 is a system block diagram showing the stage subsequent to FIG. 26.

As shown in FIG. 27, the restore processing is stopped until the split of both volumes is complete. When the storage apparatus detects that the split of both volumes is complete by referring to the control table, restoration of the journal data is resumed. When the remote site-side storage apparatus detects a marker journal, it automatically executes the processing of FIG. 23 to FIG. 27. Incidentally, the host system may designate the marker journal to the storage apparatus, and the storage apparatus may receive such designation from the host system to execute backup processing.

With reference to FIG. 18, it has been explained that only one backup time can be reserved for one consistency group, and that three backup times (three generations) can be reserved for one journal group. FIG. 28 to FIG. 31 are system configurations showing specific examples thereof.

Figure 28:
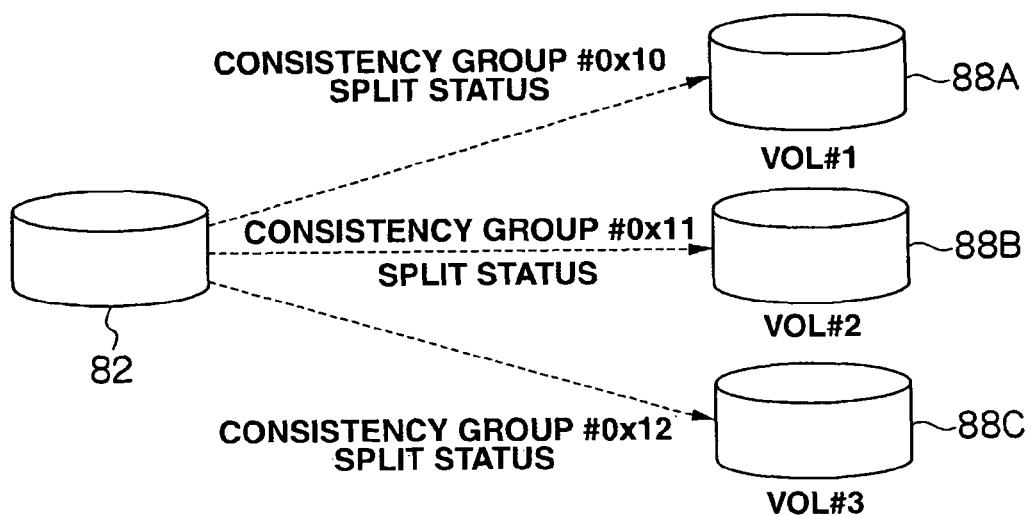
FIG. 28 is a system block diagram explaining the backup reservation and backup implementation of a plurality of generations of a secondary data volume.

In FIG. 28, the storage apparatus 12 is configuring the replica volume from a plurality of volumes formed from a plurality of generations in the order of the reservation time. Reference numeral 88A represents a volume (VOL#1) of the first generation, reference numeral 88B represents a volume (VOL#2) of the second generation, and reference numeral 88C represents a volume (VOL#3) of the third generation. The storage apparatus 12 receives a command from the host system, and sets the backup reservation time as follows in the management table of FIG. 18. The consistency group #0x10 and backup reservation time 10:00 are set to the first generation volume 88A, the consistency group #0x11 and backup reservation time 11:00 are set to the second generation volume 88B, and the consistency group #0x12 and backup reservation time 12:00 are set to the third generation volume [88C], respectively. Although three backup reservations are applied to one secondary data volume 82, this reservation does not correspond to the foregoing forbidden condition since the consistency groups are separated individually.

Journal data is sequentially restored in the secondary data volume 82. FIG. 28 shows a status where the current time has not yet reached 10:00. In this status, the replica volumes 88A to 88C of all generations are split from the secondary data volume.

Figure 29:
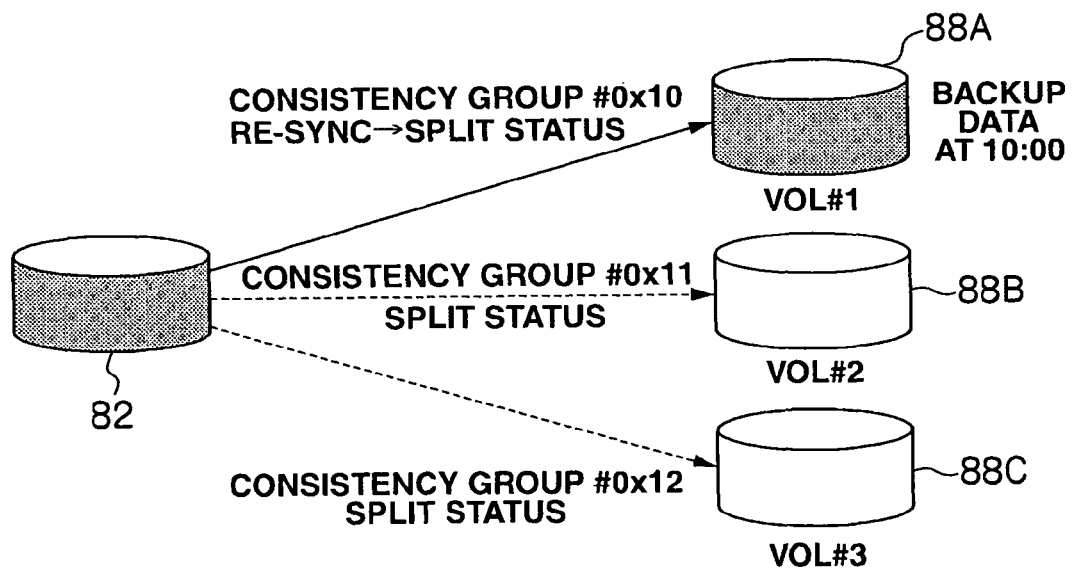
FIG. 29 is a system block diagram showing the stage subsequent to FIG. 28.

FIG. 29 is a system diagram showing a case where the journal data has a time stamp of 10:00 or later as the reservation time in the first generation, and the storage apparatus 12 has detected this time stamp. The storage apparatus stops the restoration to the secondary data volume 82, and re-synchs the replica 88A of the first generation with the secondary data volume 82. The other replica volumes are still split from the secondary data volume.

When the storage apparatus completes backing up data up to 10:00 in the volume 88A, it splits the volume 88A from the secondary data volume, and resumes the restoration to the secondary data volume.

Figure 30:
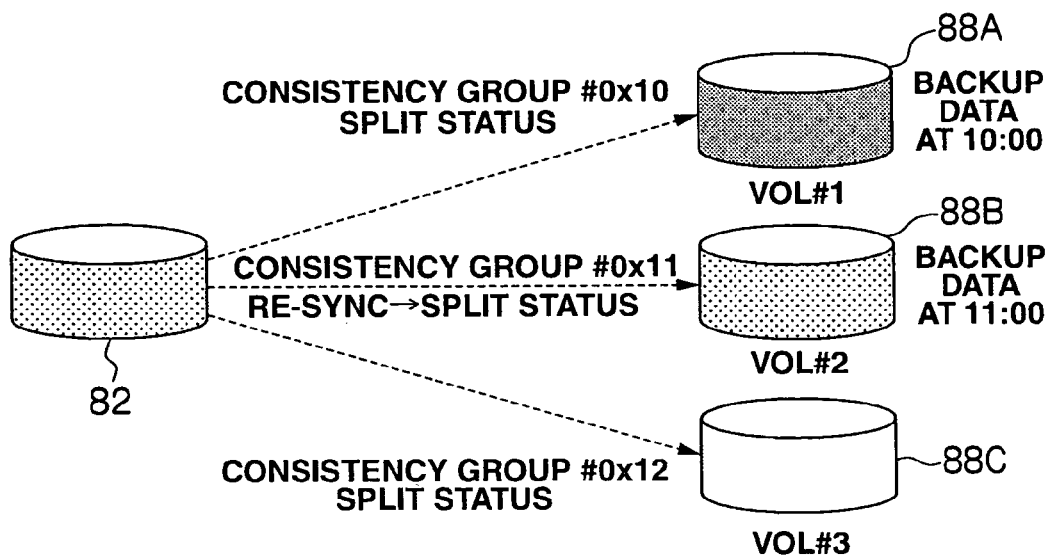
FIG. 30 is a system block diagram showing the stage subsequent to FIG. 29.
Figure 31:
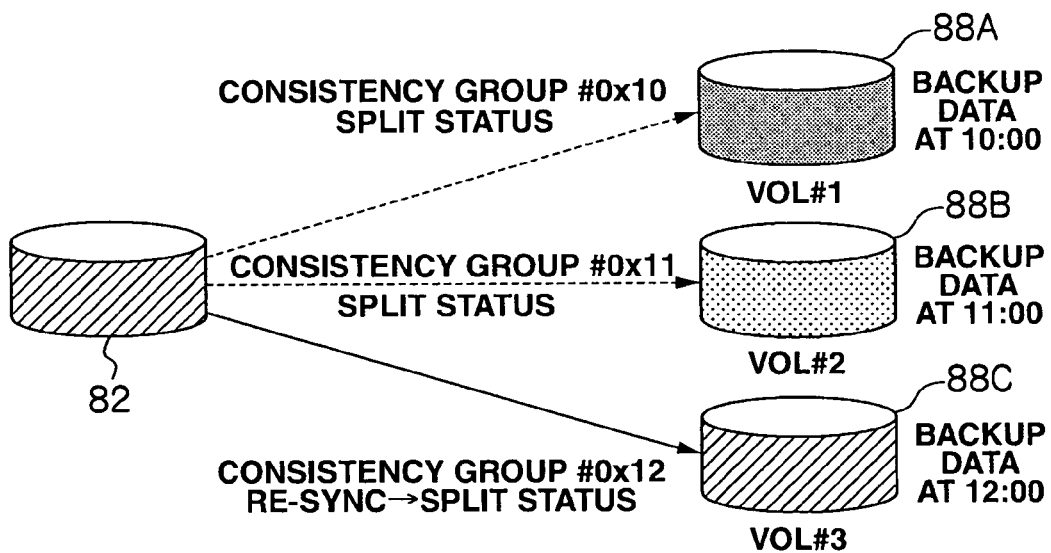
FIG. 31 is a system block diagram showing the stage subsequent to FIG. 30.

In FIG. 30, when the storage apparatus detects a journal of 11:00 or later during the process of restoration, the storage apparatus stops the restoration, and re-synchs the replica 88B of the second generation with the secondary data volume 82. The other replicas are still split from the secondary data volume.

When the storage apparatus completes copying the difference of data up to 11:00 to the replica 88B, it splits the replica 88B from the secondary data volume, and starts the restoration processing.

Further, when the storage apparatus detects a journal of 12:00 or later during the process of restoration, the storage apparatus stops the restoration, and re-synchs the replica 88C of the third generation with the secondary data volume. The other replicas are split from the secondary data volume.

When the storage apparatus completes the backup of data up to 12:00 in the replica 88C, it splits the replica 88C from the secondary data volume. Accordingly, the storage apparatus 12 is able to create a backup volume of each generation.

In the foregoing embodiments, although a case was explained where journal data is purged from the journal volume after restoring the journal data from the secondary journal volume 86 to the secondary data volume 82, it is also possible to leave the journal data in the journal volume and restore the journal data to the secondary data volume at a necessary timing. Therefore, since the secondary data volume itself will become a backup volume, it is possible to omit the backup volume based on the replica function described above.

In the foregoing embodiments, although a case was explained where a hard disk device is used as the high-capacity storage device, a semiconductor memory such as a flash memory may also be used. In the foregoing embodiments, although a case was explained where the host system sends commands concerning the remote copy and backup to the storage apparatus, a management terminal may also issue such commands.

The foregoing embodiments illustrate an example of the present invention, and the present invention covers all modes in which persons skilled in the art can easily modify the foregoing embodiments.

We claim:

1. A remote copy system for copying write data, which is sent from a host system to a first storage system configuring a local site, from said first storage system to a second storage system configuring a remote site,
    wherein said first storage system comprises:
    a primary data volume to which said write data is written;
    a first controller for creating journal data from said write data;
    a primary journal volume for storing the created journal data; and
    a second controller for transferring the journal data stored in said primary journal volume to said second storage apparatus;
    wherein said second storage system comprises:
    a secondary journal volume for storing the journal data transferred from said first storage apparatus;
    a secondary data volume corresponding to said primary data volume;
    a replica volume corresponding to said secondary volume;
    a third controller
    wherein said journal data is given a time stamp; and
    wherein said third controller continues to receive said journal data transferred from said first storage apparatus to store said received journal data in said secondary journal volume while said third controller:
    (a) restores said journal data to said secondary data volume from said secondary journal volume and split a pair between said secondary data volume and said replica volume until a designated time;
    (b) stops restoring said journal data to said secondary data volume from said secondary journal volume and starts to replicate data stored in said secondary data volume to said replicated volume when said time stamp exceeds said designated time and
    (c) resumes to restore said journal data to said secondary data volume from said secondary journal volume and splits pair between said secondary data volume and said replica volume after said third controller finishes replicating data stored in said secondary data volume to said replicated volume.

2. The remote copy system according to claim 1, further comprising a control table for mutually associating said primary data volume, said primary journal volume, said secondary journal volume, and said secondary data volume as a first group; mutually associating said secondary data volume and said replica as a second group; and having a correspondence with said first group and said second group.

3. The remote copy system according to claim 2, wherein there are a plurality of said first groups and a plurality of said second groups, and said control table corresponds said first group and said second group one-on-one.

4. The remote copy system according to claim 3, wherein said first storage system and said second storage system are respectively configured from a plurality of storage apparatuses; and
    wherein said plurality of first groups and said plurality of second groups are set to an aggregate of the respective storage resources of said plurality of storage apparatuses.

5. The remote copy system according to claim 1, wherein said second storage system comprises a hard disk drive, and the storage resource of said hard disk drive is allocated to at least said journal volume of said primary journal volume and said secondary journal volume.

* * * * *